(12) United States Patent  
Anderson et al.

(10) Patent No.: US 8,021,274 B2  
(45) Date of Patent: Sep. 20, 2011

(54) STRIDE ADJUSTMENT MECHANISM

(75) Inventors: Timothy T. Anderson, Antioch, IL (US); Rachel Lara Abigal Buckley, North Barrington, IL (US); Juliette C. Daly, Chicago, IL (US); John J. Hsing, Chicago, IL (US); Gregory A. Joseph, Naperville, IL (US); Gary E. Oglesby, Manhattan, IL (US); John M. Rogus, Skokie, IL (US); Robert C. Seaman, Washougal, WA (US); Mark C. Termion, Winfield, IL (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 12/456,938

(22) Filed: Jun. 23, 2009

(65) Prior Publication Data

US 2009/0264257 A1   Oct. 22, 2009

Related U.S. Application Data

(60) Division of application No. 10/923,053, filed on Aug. 23, 2004, now Pat. No. 7,559,879, which is a continuation-in-part of application No. 10/787,788, filed on Feb. 26, 2004, now Pat. No. 7,435,202, and a continuation-in-part of application No. 09/835,672, filed on Apr. 16, 2001, now Pat. No. 6,846,272.

(60) Provisional application No. 60/540,812, filed on Feb. 27, 2003, provisional application No. 60/501,988, filed on Sep. 11, 2003.

(51) Int. Cl.
*A63B 22/04* (2006.01)
*A63B 22/00* (2006.01)
*A63B 69/16* (2006.01)

(52) U.S. Cl. .................... 482/52; 482/57; 482/9

(58) Field of Classification Search ............. 482/51–54, 482/57, 79–80
See application file for complete search history.

(56) References Cited

U.S. PATENT DOCUMENTS

| | | | |
|---|---|---|---|
| 6,440,042 B2 * | 8/2002 | Eschenbach | 482/52 |
| 6,612,969 B2 * | 9/2003 | Eschenbach | 482/51 |
| 6,672,994 B1 * | 1/2004 | Stearns et al. | 482/57 |
| 6,846,272 B2 * | 1/2005 | Rosenow et al. | 482/52 |
| 7,267,637 B2 * | 9/2007 | Mercado et al. | 482/52 |
| 7,270,626 B2 * | 9/2007 | Porth | 482/52 |
| 7,435,202 B2 * | 10/2008 | Daly et al. | 482/52 |
| 7,435,203 B2 * | 10/2008 | Anderson et al. | 482/52 |
| 2005/0075213 A1 * | 4/2005 | Arick | 482/1 |
| 2007/0232457 A1 * | 10/2007 | Porth | 482/51 |

* cited by examiner

*Primary Examiner* — Stephen Crow  
(74) *Attorney, Agent, or Firm* — Michael B. McMurry

(57) ABSTRACT

In an elliptical step exercise apparatus a dynamic link mechanism can be used to vary the stride length of the machine. A control system can also be used to vary stride length as a function of various exercise and operating parameters such as speed and direction as well as varying stride length as a part of a preprogrammed exercise routine such as a hill or interval training program. In addition the control system can use measurements of stride length to optimize operation of the apparatus.

16 Claims, 18 Drawing Sheets

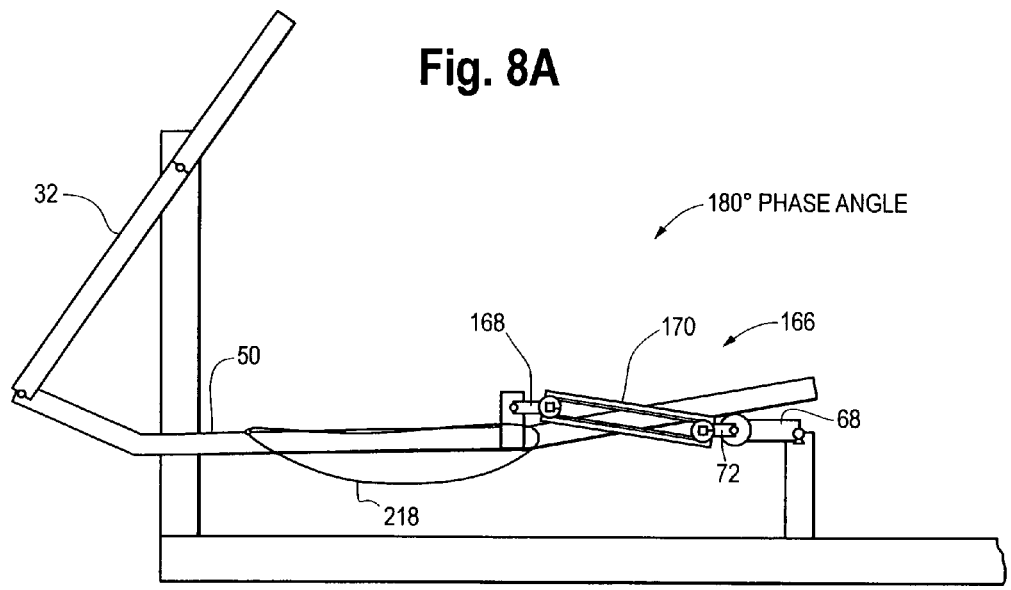
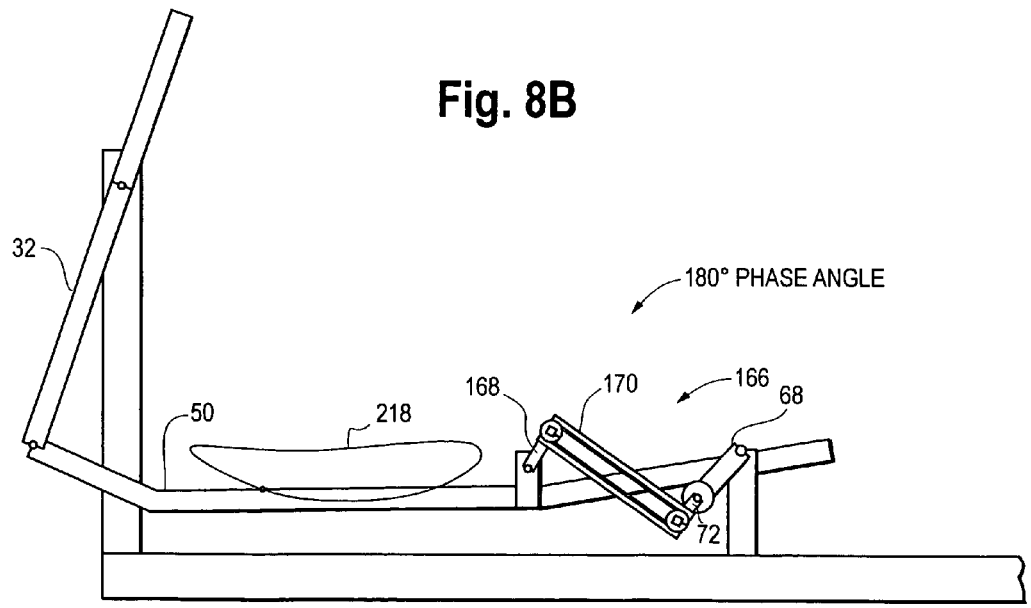

STRIDE ADJUSTMENT MECHANISM

CROSS-REFERENCE TO RELATED APPLICATIONS

This application is a divisional of U.S. Non-Provisional patent application Ser. No. 10/923,053, filed Aug. 23, 2004, now U.S. Pat. No. 7,559,879, which is a continuation in part of U.S. Non-Provisional patent application Ser. No. 09/835,672, filed Apr. 16, 2001, now U.S. Pat. No. 6,846,272; and Ser. No. 10/787,788, filed Feb. 26, 2004, now U.S. Pat. No. 7,435,202; and claims priority on U.S. Provisional Patent Application Ser. No. 60/450,812, filed Feb. 27, 2003 and Ser. No. 60/501,988, filed Sep. 11, 2003.

FIELD OF THE INVENTION

This invention generally relates mechanisms to control exercise equipment and in particular to programs for controlling stride adjustment of elliptical exercise equipment.

BACKGROUND OF THE INVENTION

There are a number of different types of exercise apparatus that exercise a user's lower body by providing a circuitous stepping motion. These elliptical stepping apparatus provide advantages over other types of exercise apparatuses. For example, the elliptical stepping motion generally reduces shock on the user's knees as can occur when a treadmill is used. In addition, elliptical stepping apparatuses exercise the user's lower body to a greater extent than, for example, cycling-type exercise apparatuses. Examples of elliptical stepping apparatuses are shown in U.S. Pat. Nos. 3,316,898; 5,242,343; 5,383,829; 5,499,956; 5,529,555, 5,685,804; 5,743,834, 5,759,136; 5,762,588; 5,779,599; 5,577,985, 5,792,026; 5,895,339, 5,899,833, 6,027,431, 6,099,439, 6,146,313, and German Patent No. DE 2 919 494.

An important feature in an elliptical stepping apparatus is the ability to adjust stride length. Naturally, different people have different stride lengths and the exercise apparatus needs to accommodate each user so that they have a more comfortable and efficient workout. It is also important that the user can change the stride length during the operation of the elliptical stepping device. When the user increases the speed, then naturally he will have a longer stride length and the machine needs to adjust to this change in length. A problem with elliptical exercise machines used in the past is that they can not adjust horizontal stride length without significantly changing vertical height of the foot motion. It is therefore advantageous for the user to minimize the vertical displacement of the footpath when stride length changes because it allows for more natural and comfortable motion.

SUMMARY OF THE INVENTION

It is therefore an object of the invention to minimize the vertical displacement of the footpath when the stride length changes.

A further object of the invention is to use a dynamic link mechanism to adjust stride length which allows for a smooth transition of stride lengths during operation and minimizes the vertical displacement when stride length changes.

A still further object of the invention is to allow a runner to adjust cadence independently while changing stride length.

An additional object of the invention is to allow the use sensors and a processor to compare stride lengths of the left and right pedal and automatically adjust them to be equal.

BRIEF DESCRIPTION OF THE DRAWINGS

FIGS. 8A, 8B, 8C and 8D are schematic diagrams illustrating the operation of the dynamic link mechanism of FIGS. 4-7 for a 180 degree phase angle;

DETAILED DESCRIPTION OF THE INVENTION

Figure 1:
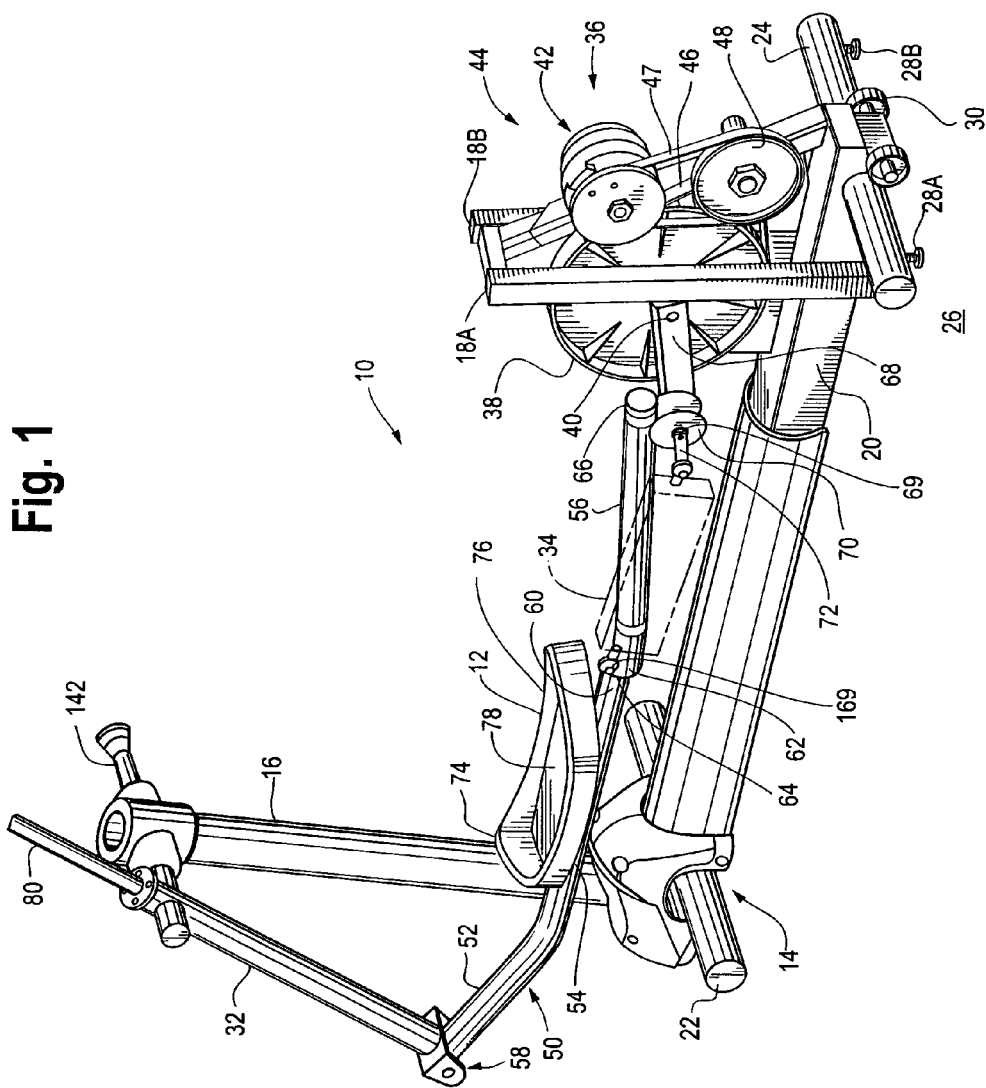
FIG. 1 is a side perspective view of an elliptical stepping exercise apparatus.

FIG. 1 depicts a representative example of an elliptical step exercise apparatus 10 of the type that can be modified to have the capability of adjusting the stride or the path of the foot pedal 12. The exercise apparatus 10 includes a frame, shown generally at 14. The frame 14 includes vertical support members 16, 18A and 18B which are secured to a longitudinal support member 20. The frame 14 further includes cross members 22 and 24 which are also secured to and bisect the longitudinal support member 20. The cross members 22 and 24 are configured for placement on a floor 26. A pair of levelers, 28A and 28B are secured to cross member 24 so that if the floor 26 is uneven, the cross member 24 can be raised or lowered such that the cross member 24, and the longitudinal support member 20 are substantially level. Additionally, a pair of wheels 30 are secured to the longitudinal support member 20 of the frame 14 at the rear of the exercise apparatus 10 so that the exercise apparatus 10 is easily moveable.

The exercise apparatus 10 further includes the rocker 32, an attachment assembly 34 and a resistance or motion controlling assembly 36. The motion controlling assembly 36 includes the pulley 38 supported by vertical support members 18A and 18B around the pivot axle 40. The motion controlling assembly 36 also includes resistive force and control components, including the alternator 42 and the speed increasing transmission 44 that includes the pulley 38. The alternator 42 provides a resistive torque that is transmitted to the pedal 12 and to the rocker 32 through the speed increasing transmission 44. The alternator 42 thus acts as a brake to apply a controllable resistive force to the movement of the pedal 12 and the movement of the rocker 32. Alternatively, a resistive force can be provided by any suitable component, for example, by an eddy current brake, a friction brake, a band brake or a hydraulic braking system. Specifically, the speed increasing transmission 44 includes the pulley 38 which is coupled by the first belt 46 to the second double pulley 48. The second double pulley 48 is then connected to the alternator 42 by a second belt 47. The speed increasing transmission 44 thereby transmits the resistive force provided by the alternator 42 to the pedal 12 and the rocker 32 via the pulley 38. The pedal lever 50 includes a first portion 52, a second portion 54 and a third portion 56. The first portion 52 of the pedal lever 50 has a forward end 58. The pedal 12 is secured to the top surface 60 of the second portion 54 of the pedal lever 50 by any suitable securing means. In this apparatus 10, the pedal 12 is secured such that the pedal 12 is substantially parallel to the second portion of the pedal lever 54. A bracket 62 is located at the rearward end 64 of the second portion 54. The third portion 56 of the pedal lever 50 has a rearward end 66.

In this particular example of an elliptical step apparatus, the crank 68 is connected to and rotates about the pivot axle 40 and a roller axle 69 is secured to the other end of the crank 68 to rotatably mount the roller 70 so that it can rotate about the roller axle 69. The extension arm 72 is secured to the roller axle 69 making it an extension of the crank 68. The extension arm 72 is fixed with respect to the crank 68 and together they both rotate about the pivot axle 40. The rearward end of the attachment assembly 34 is pivotally connected to the end of the extension arm 72. The forward end of the attachment assembly 34 is pivotally connected to the bracket 62.

The pedal 12 of the exercise apparatus 10 includes a toe portion 74 and a heel portion 76 so that the heel portion 76 is intermediate the toe portion 74 and the pivot axle 40. The pedal 12 of the exercise apparatus 10 also includes a top surface 78. The pedal 12 is secured to the top surface 60 of the pedal lever 50 in a manner so that the desired foot weight distribution and flexure are achieved when the pedal 12 travels in the substantially elliptical pathway as the rearward end 66 of the third portion 56 of the pedal lever 50 rolls on top of the roller 70, traveling in a rotationally arcuate pathway with respect to the pivot axle 40 and moves in an elliptical pathway around the pivot axle 40. Since the rearward end 66 of the pedal lever 50 is not maintained at a predetermined distance from the pivot axis 40 but instead follows the elliptical pathway, a more refined foot motion is achieved. It should be understood however that the invention can be implemented on other configurations of elliptical step apparatus having a variety of mechanisms for connecting the pedal lever 50 to the crank arm 68 including a direct attachment.

Figure 2:
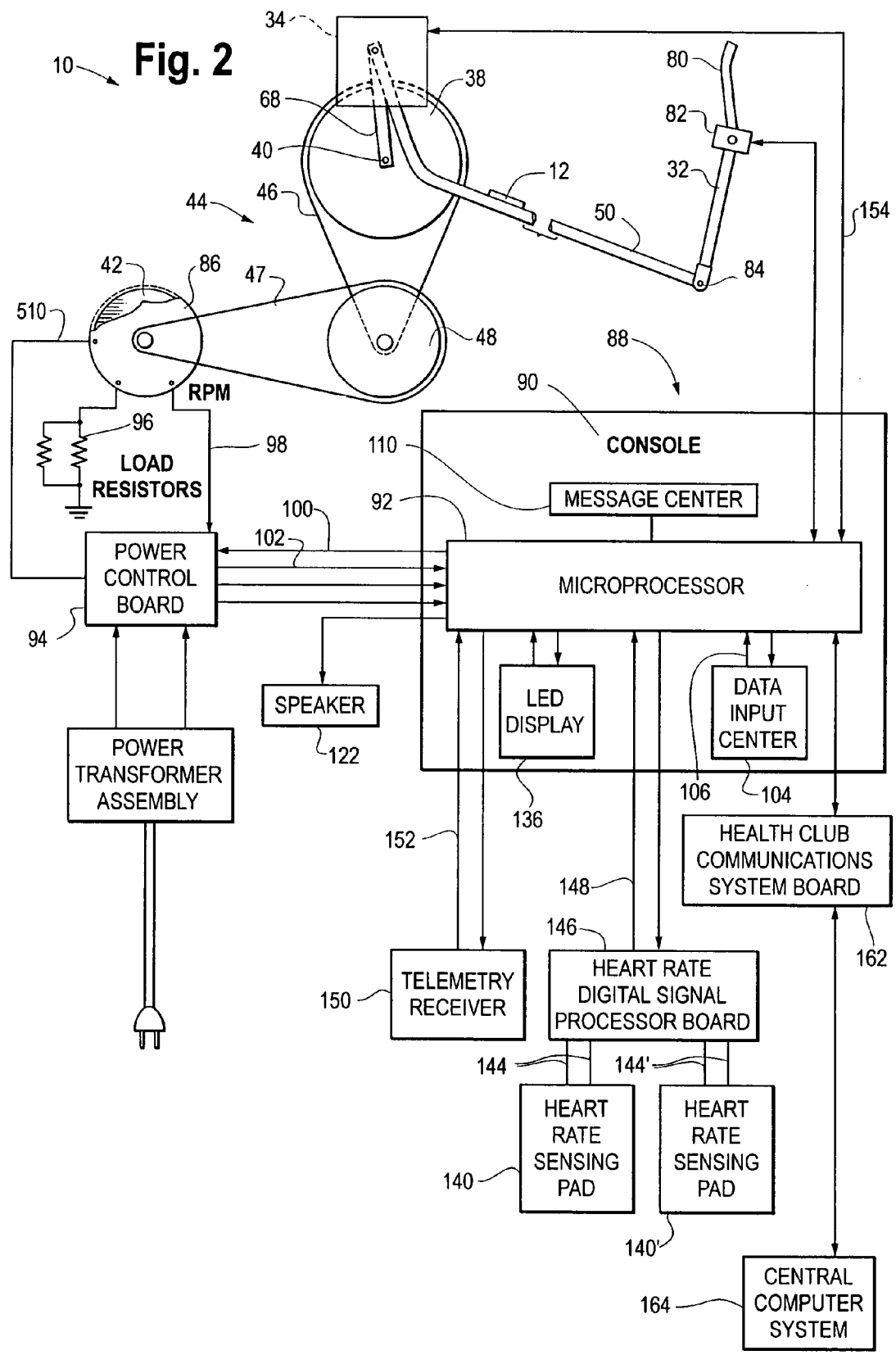
FIG. 2 is a schematic and block diagram of representative mechanical and electrical components of an example of an elliptical stepping exercise apparatus in which the method of the invention can be implemented.

FIG. 2 is a combination schematic and block diagram that provides an environment for describing the invention and for simplicity shows in schematic form only one of two pedal mechanisms typically used in an elliptical stepping exercise apparatus such as the apparatus 10. In particular, the exercise apparatus 10 described herein includes motion controlling components which operate in conjunction with an attachment assembly to provide an elliptical stepping exercise experience for the user. Included in this example of an elliptical stepping exercise apparatus 10 are the rocker 32, the pedal 12 secured to the pedal lever 50, the pulley 38 supported by the vertical support members 18A and 18B and which is rotatable on the pivot axle 40. This embodiment also includes an arm handle 80 that is connected to the rocker 32 at a pivot point 82 on the frame of the apparatus 10. The crank 68 is generally connected to one end of the pedal lever 50 by an attachment assembly represented by the box 34 and rotates with the pulley 38 while the other end of the pedal lever 50 is pivotally attached to the rocker 32 at the pivot point 84.

The apparatus 10 as represented in FIG. 2 also includes resistive force and control components, including the alternator 42 and the speed increasing transmission 44 that includes the pulley 38. The alternator 42 provides a resistive torque that is transmitted to the pedal 12 and to the rocker 32 through the speed increasing transmission 44. The alternator 42 thus acts as a brake to apply a controllable resistive force to the movement of the pedal 12 and the movement of the rocker 32. Alternatively, a resistive force can be provided by any suitable component, for example, by an eddy current brake, a friction brake, a band brake or a hydraulic braking system. Specifically, the speed increasing transmission 44 includes the pulley 38 which is coupled by a first belt 46 to a second double pulley 48. A second belt 47 connects the second double pulley 48 to a flywheel 86 of the alternator 42. The speed increasing transmission 44 thereby transmits the resistive force provided by the alternator 42 to the pedal 12 and the rocker 32 via the pulley 38. Since the speed increasing transmission 44 causes the alternator 42 to rotate at a greater rate than the pivot axle 40, the alternator 42 can provide a more controlled resistance force. Preferably the speed increasing transmission 44 should increase the rate of rotation of the alternator 42 by a factor of 20 to 60 times the rate of rotation of the pivot axle 40 and in this embodiment the pulleys 38 and 48 are sized to provide a multiplication in speed by a factor of 40. Also, size of the transmission 44 is reduced by providing a two stage transmission using pulleys 38 and 48.

FIG. 2 additionally provides an illustration of a control system 88 and a user input and display console 90 that can be used with elliptical exercise apparatus 10 or other similar elliptical exercise apparatus to implement the invention. In this particular embodiment of the control system 88, a microprocessor 92 is housed within the console 90 and is operatively connected to the alternator 42 via a power control board 94. The alternator 42 is also operatively connected to a ground through load resistors 96. A pulse width modulated output signal on a line 98 from the power control board 94 is controlled by the microprocessor 92 and varies the current applied to the field of the alternator 42 by a predetermined field control signal on a line 100, in order to provide a resistive force which is transmitted to the pedal 12 and to the arm 80. When the user steps on the pedal 12, the motion of the pedal 12 is detected as a change in an RPM signal which represents pedal speed on a line 102. It should be noted that other types of speed sensors such as optical sensors can be used in machines of the type 10 to provide pedal speed signals. Thereafter, as explained in more detail below, the resistive force of the alternator 42 is varied by the microprocessor 92 in accordance with the specific exercise program selected by the user so that the user can operate the pedal 12 as previously described.

Figure 3:
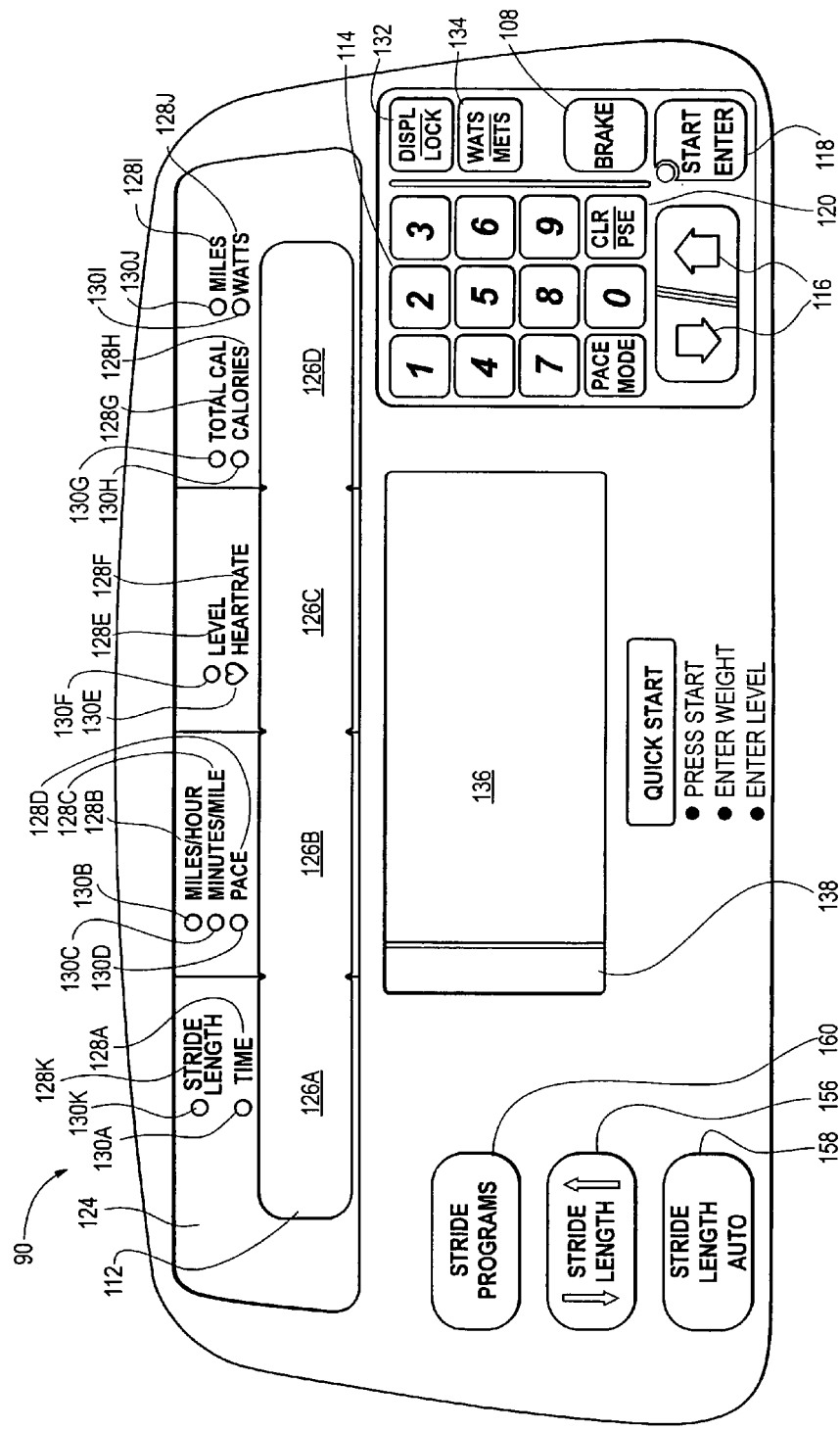
FIG. 3 is a plan layout of a display console for use with the elliptical exercise apparatus shown in FIG. 2.

The alternator 42 and the microprocessor 92 also interact to stop the motion of the pedal 12 when, for example, the user wants to terminate his exercise session on the apparatus 10. A data input center 104, which is operatively connected to the microprocessor 92 over a line 106, includes a brake key 108, as shown in FIG. 3, that can be employed by the user to stop the rotation of the pulley 38 and hence the motion of the pedal 12. When the user depresses the brake key 108, a stop signal is transmitted to the microprocessor 92 via an output signal on the line 106 of the data input center 104. Thereafter, the field control signal 100 of the microprocessor 92 is varied to increase the resistive load applied to the alternator 42. The output signal 98 of the alternator provides a measurement of the speed at which the pedal 12 is moving as a function of the revolutions per minute (RPM) of the alternator 42. A second output signal on the line 102 of the power control board 94 transmits the RPM signal to the microprocessor 92. The microprocessor 92 continues to apply a resistive load to the alternator 42 via the power control board 94 until the RPM equals a predetermined minimum which, in the preferred embodiment, is equal to or less than 5 RPM.

In this embodiment, the microprocessor 92 can also vary the resistive force of the alternator 42 in response to the user's input to provide different exercise levels. A message center 110 includes an alpha-numeric display screen 112, shown in FIG. 3, that displays messages to prompt the user in selecting one of several pre-programmed exercise levels. In the preferred embodiment, there are twenty-four pre-programmed exercise levels, with level one being the least difficult and level 24 the most difficult. The data input center 104 includes a numeric key pad 114 and a pair of selection arrows 116, shown in FIG. 3, either of which can be employed by the user to choose one of the pre-programmed exercise levels. For example, the user can select an exercise level by entering the number, corresponding to the exercise level, on the numeric keypad 114 and thereafter depressing a start/enter key 118. Alternatively, the user can select the desired exercise level by using the selection arrows 116 to change the level displayed on the alpha-numeric display screen 112 and thereafter depressing the start/enter key 118 when the desired exercise level is displayed. The data input center 104 also includes a clear/pause key 120, show in FIG. 3, which can be pressed by the user to clear or erase the data input before the start/enter key 118 is pressed. In addition, the exercise apparatus 10 includes a user-feedback apparatus that informs the user if the data entered are appropriate. In this embodiment, the user feed-back apparatus is a speaker 122, that is operatively connected to the microprocessor 92. The speaker 122 generates two sounds, one of which signals an improper selection and the second of which signals a proper selection. For example, if the user enters a number between 1 and 24 in response to the exercise level prompt displayed on the alpha-numeric screen 112, the speaker 122 generates the correct-input sound. On the other hand, if the user enters an incorrect datum, such as the number 100 for an exercise level, the speaker 122 generates the incorrect-input sound thereby informing the user that the data input was improper. The alpha-numeric display screen 112 also displays a message that informs the user that the data input was improper. Once the user selects the desired appropriate exercise level, the microprocessor 92 transmits a field control signal on the line 100 that sets the resistive load applied to the alternator 42 to a level corresponding with the pre-programmed exercise level chosen by the user.

The message center 110 displays various types of information while the user is exercising on the apparatus 10. As shown in FIG. 3, the alpha-numeric display panel 124, shown on FIG. 3, is divided into four sub-panels 126A-D, each of which is associated with specific types of information. Labels 128A-K and LED indicators 130A-K located above the sub-panels 126A-D indicate the type of information displayed in the sub-panels 126A-D. The first sub-panel 126A displays the time elapsed since the user began exercising on the exercise apparatus 10 or the current stride length of the apparatus 10. One of the LED indicators 130A or 130K is illuminated depending if time or stride length is being displayed. The second sub-panel 126B displays the pace at which the user is exercising. In the preferred embodiment, the pace can be displayed in miles per hour, minutes per mile or equivalent metric units as well as RPM. One of the LED indicators 130B-130D is illuminated to indicate in which of these units the pace is being displayed. The third sub-panel 126C displays either the exercise level chosen by the user or, as explained below, the heart rate of the user. The LED indicator 130F associated with the exercise level label 128E is illuminated when the level is displayed in the sub-panel 126C and the LED indicator 130E associated with the heart rate label 128F is illuminated when the sub-panel 126C displays the user's heart rate. The fourth sub-panel 126D displays four types of information: the calories per hour at which the user is currently exercising; the total calories that the user has actually expended during exercise; the distance, in miles or kilometers, that the user has "traveled" while exercising; and the power, in watts, that the user is currently generating. In the default mode of operation, the fourth sub-panel 126D scrolls among the four types of information. As each of the four types of information is displayed, the associated LED indicators 130G-J are individually illuminated, thereby identifying the information currently being displayed by the sub-panel 126D. A display lock key 132, located within the data input center 104, shown in FIG. 2, can be employed by the user to halt the scrolling display so that the sub-panel 126D continuously displays only one of the four information types. In addition, the user can lock the units of the power display in watts or in metabolic units ("mets"), or the user can change the units of the power display, to watts or mets or both, by depressing a watts/mets key 134 located within the data input center 104.

In the preferred embodiment of the invention, the exercise apparatus 10 also provides several pre-programmed exercise programs that are stored within and implemented by the microprocessor 92. The different exercise programs further promote an enjoyable exercise experience and enhance exercise efficiency. The alpha-numeric display screen 112 of the message center 110, together with a display panel 136, guide the user through the various exercise programs. Specifically, the alpha-numeric display screen 112 prompts the user to select among the various preprogrammed exercise programs and prompts the user to supply the data needed to implement the chosen exercise program. The display panel 136 displays a graphical image that represents the current exercise program. The simplest exercise program is a manual exercise program. In the manual exercise program the user simply chooses one of the twenty-four previously described exercise levels. In this case, the graphic image displayed by the display panel 136 is essentially flat and the different exercise levels are distinguished as vertically spaced-apart flat displays. A second exercise program, a so-called hill profile program, varies the effort required by the user in a pre-determined fashion which is designed to simulate movement along a series of hills. In implementing this program, the microprocessor 92 increases and decreases the resistive force of the alternator 42 thereby varying the amount of effort required by the user. The display panel 136 displays a series of vertical bars of varying heights that correspond to climbing up or down a series of hills. A portion 138 of the display panel 136 displays a single vertical bar whose height represents the user's current position on the displayed series of hills. A third exercise program, known as a random hill profile program, also varies the effort required by the user in a fashion which is designed to simulate movement along a series of hills. However, unlike the regular hill profile program, the random hill profile program provides a randomized sequence of hills so that the sequence varies from one exercise session to another.

A detailed description of the random hill profile program and of the regular hill profile program can be found in U.S. Pat. No. 5,358,105, the entire disclosure of which is hereby incorporated by reference.

A fourth exercise program, known as a cross training program, urges the user to manipulate the pedal 12 in both the forward-stepping mode and the backward-stepping mode. When this program is selected by the user, the user begins moving the pedal 12 in one direction, for example, in the forward direction. After a predetermined period of time, the alpha-numeric display panel 136 prompts the user to prepare to reverse directions. Thereafter, the field control signal 100 from the microprocessor 92 is varied to effectively brake the motion of the pedal 12 and the arm 80. After the pedal 12 and the arm 80 stop, the alpha-numeric display screen 112 prompts the user to resume his workout. Thereafter, the user reverses directions and resumes his workout in the opposite direction.

Two exercise programs, a cardio program and a fat burning program, vary the resistive load of the alternator 42 as a function of the user's heart rate. When the cardio program is chosen, the microprocessor 92 varies the resistive load so that the user's heart rate is maintained at a value equivalent to 80% of a quantity equal to 220 minus the user's age. In the fat burning program, the resistive load is varied so that the user's heart rate is maintained at a value equivalent to 65% of a quantity equal to 220 minus the user's heart age. Consequently, when either of these programs is chosen, the alpha-numeric display screen 112 prompts the user to enter his age as one of the program parameters. Alternatively, the user can enter a desired heart rate. In addition, the exercise apparatus 10 includes a heart rate sensing device that measures the user's heart rate as he exercises. The heart rate sensing device consists of heart rate sensors 140 and 140' that can be mounted either on the moving arms 80 or a fixed handrail 142, as shown in FIG. 1. In the preferred embodiment, the sensors 140 and 140' are mounted on the moving arms 80. A set of output signal on a set of lines 144 and 144' corresponding to the user's heart rate is transmitted from the sensors 140 and 140' to a heart rate digital signal processing board 146. The processing board 146 then transmits a heart rate signal over a line 148 to the microprocessor 92. A detailed description of the sensors 140 and 140' and the heart rate digital signal processing board 146 can be found in U.S. Pat. Nos. 5,135,447 and 5,243,993, the entire disclosures of which are hereby incorporated by reference. In addition, the exercise apparatus 10 includes a telemetry receiver 150, shown in FIG. 2, that operates in an analogous fashion and transmits a telemetric heart rate signal over a line 152 to the microprocessor 92. The telemetry receiver 150 works in conjunction with a telemetry transmitter that is worn by the user. In the preferred embodiment, the telemetry transmitter is a telemetry strap worn by the user around the user's chest, although other types of transmitters are possible. Consequently, the exercise apparatus 10 can measure the user's heart rate through the telemetry receiver 150 if the user is not grasping the arm 80. Once the heart rate signal 148 or 152 is transmitted to the microprocessor 92, the resistive load 96 of the alternator 42 is varied to maintain the user's heart rate at the calculated value.

In each of these exercise programs, the user provides data that determine the duration of the exercise program. The user can select between a number of exercise goal types including a time or a calories goal or, in the preferred embodiment of the invention, a distance goal. If the time goal type is chosen, the alpha-numeric display screen 112 prompts the user to enter the total time that he wants to exercise or, if the calories goal type is selected, the user enters the total number of calories that he wants to expend. Alternatively, the user can enter the total distance either in miles or kilometers. The microprocessor 92 then implements the selected exercise program for a period corresponding to the user's goal. If the user wants to stop exercising temporarily after the microprocessor 92 begins implementing the selected exercise program, depressing the clear/pause key 120 effectively brakes the pedal 12 and the arm 80 without erasing or changing any of the current program parameters. The user can then resume the selected exercise program by depressing the start/enter key 118. Alternatively, if the user wants to stop exercising altogether before the exercise program has been completed, the user simply depresses the brake key 108 to brake the pedal 12 and the arm 80. Thereafter, the user can resume exercising by depressing the start/enter key 118. In addition, the user can stop exercising by ceasing to move the pedal 12. The user then can resume exercising by again moving the pedal 12.

The exercise apparatus 10 also includes a pace option. In all but the cardio program and the fat burning program, the default mode is defined such that the pace option is on and the microprocessor 92 varies the resistive load of the alternator 42 as a function of the user's pace. When the pace option is on, the magnitude of the RPM signal 102 received by the microprocessor 92 determines the percentage of time during which the field control signal 100 is enabled and thereby the resistive force of the alternator 42. In general, the instantaneous velocity as represented by the RPM signal 102 is compared to a predetermined value to determine if the resistive force of the alternator 42 should be increased or decreased. In the presently preferred embodiment, the predetermined value is a constant of 30 RPM. Alternatively, the predetermined value could vary as a function of the exercise level chosen by the user. Thus, in the presently preferred embodiment, if the RPM signal 102 indicates that the instantaneous velocity of the pulley 38 is greater than 30 RPM, the percentage of time that the field control signal 100 is enabled is increased according to Equation 1.

$$\text{field control duty cycle} = \text{field control duty cycle} + \left(\left(\left|\frac{(\text{instantaneous } RPM - 30)/2)^2 * \text{field control duty cycle}}{256}\right|\right)\right) \quad \text{Equation 1}$$

where field duty cycle is a variable that represents the percentage of time that the field control signal 100 is enabled and where the instantaneous RPM represents the instantaneous value of the RPM signal 98.

On the other hand, in the presently preferred embodiment, if the RPM signal 102 indicates that the instantaneous velocity of the pulley 38 is less than 30 RPM, the percentage of time that the field control signal 100 is enabled is decreased according to Equation 2.

$$\text{field control duty cycle} = \text{field control duty cycle} - \left(\left(\left|\frac{(\text{instantaneous } RPM - 30)/2)^2 * \text{field control duty cycle}}{256}\right|\right)\right) \quad \text{Equation 2}$$

where field duty cycle is a variable that represents the percentage of time that the field control signal 100 is enabled and where the instantaneous RPM represents the instantaneous value of the RPM signal 102.

Moreover, once the user chooses an exercise level, the initial percentage of time that the field control signal 100 is enabled is pre-programmed as a function of the chosen exercise level as described in U.S. Pat. No. 6,099,439.

Manual and Automatic Stride Length Adjustment

In these embodiments of the invention, stride length can be varied automatically as a function of exercise or apparatus parameters. Specifically, the control system 88 and the console 90 of FIG. 2 can be used to control stride length in the elliptical step exercise apparatus 10 either manually or as a function of a user or operating parameter. In the examples of FIGS. 1 and 2 the attachment assembly 34 generally represented within the dashed lines can be implemented by a number of mechanisms that provide for stride adjustment such as the stride length adjustment mechanisms depicted in FIGS. 4-7, 8A-D, 9A-D and 10A-D. As shown in FIG. 2, a line 154 connects the microprocessor 92 to the electronically controlled actuator elements of the adjustment mechanisms in the attachment assembly 34. Stride length can then be varied by the user via a manual stride length key 156, shown in FIG. 3, which is connected to the microprocessor 92 via the data input center 104. Alternatively, the user can have stride length automatically varied by using a stride length auto key 158 that is also connected to the microprocessor 92 via the data input center 104. In one embodiment, the microprocessor 92 is programmed to respond to the speed signal on line 102 to increase the stride length as the speed of the pedal 12 increases. Pedal direction, as indicated by the speed signal can also be used to vary stride length. For example, if the microprocessor 92 determines that the user is stepping backward on the pedal 12, the stride length can be reduced since an individuals stride is usually shorter when stepping backward. Additionally, the microprocessor 92 can be programmed to vary stride length as function of other parameters such as resistive force generated by the alternator 42; heart rate measured by the sensors 140 and 140'; and user data such as weight and height entered into the console 90.

Adjustable Stride Programs

Adjustable stride mechanisms make it possible to provide enhanced pre-programmed exercise programs of the type described above that are stored within and implemented by the microprocessor 92. As with the previously described exercise programs, the alpha-numeric display screen 112 of the message center 110, together with a display panel 136, can be used to guide the user through the various exercise programs. Specifically, the alpha-numeric display screen 112 prompts the user to select among the various preprogrammed exercise programs and prompts the user to supply the data needed to implement the selected exercise program. The display panel 136 also displays a graphical image that represents the current exercise program. For example, the graphic image displayed by the display panel 136 representing different exercise levels can include the series of vertical bars of varying heights that correspond to resistance levels that simulate climbing up or down a series of hills. In this embodiment, the portion 138 of the display panel 136 displays a single vertical bar whose height represents the user's current position on the displayed series of hills. Adjustable stride length programs can be selected by the user utilizing a stride program key 160, as shown in FIG. 3, which is connected to the microprocessor 92 via the data input center 104.

A first program can be used to simulate hiking on a hill or mountain. For example, the program can begin with short strides and a high resistance to simulate climbing a hill then after a predetermined time change to long strides at low resistance to simulate walking down the hill. The current hill and upcoming hills can be displayed on the display panel 136 where the length of the stride and the resistance change at each peak and valley. In one implementation, the initial or up hill stride would be 16 inches and the down hill stride would be 24 inches, where the program automatically adjusts the initial stride length to 16 inches at the beginning of the program. Also, the program can return the stride length to a home position, for instance 20 inches, during a cool down portion of the program.

A second program can be used to change both the stride length and the resistance levels on a random basis. Preferably, the changes in stride length and resistance levels are independent of each other. Also in one embodiment, the changes in stride length occur at different time intervals than the changes in resistance levels. For example, a random stride length change might occur every even minute and a random resistance level change might occur at every odd minute of the program. Preferably, the changes in increments will be plus or minus 2 inches or more. Again, the program can return the stride length to a home position, for instance 20 inches, during a cool down portion of the program.

A third program can be used to simulate interval training for runners. In one embodiment, by using stride length changes in the longer strides and having the processor 92 generates motivating message prompts on the display 136, interval training and the gentle slopes and intervals one would experience when training as a runner outdoors are mimicked. For example, the program spans the stride range of 22"-26" with an initial warm-up beginning at 22" then moving to 24". Here the program then alternate between the 24" and 26" strides thus mimicking intervals at the longer strides such as those experienced by a runner in training. In addition, the display 136 can alert the user to "Go faster" and "Go slower" at certain intervals. As indicated here, it is preferable that the prompts be used to encourage faster and slower pedal speeds. A representative example of such a program is provided below:

Warm-up:
Prompt "Warm Up" message
Minute 00:00=22" stride (If machine is not at 22" at program start-up, then it will adjust to the 22" stride length at program start.)
Minute 03:00=24" stride
Minute 03:30= prompt "Go faster" message
Intervals:
Minute 04:00=26" stride
Minute 08:30=prompt "Go slower" message
Minute 09:00=24" stride
Minute 10:30=prompt "Go faster" message
Minute 11:00=26" stride
Minute 15:30=prompt "Go slower" message where the first change is initiated at the 03:00 minute mark, during the warm-up phase. Other aspects of this particular interval program include: stride adjustment increments of 2"; minimum duration of 10 minutes; and repeating the interval phase for the selected duration of the program.

Operation of the Apparatus

The preferred embodiment of the exercise apparatus 10 further includes a communications board 162 that links the microprocessor 92 to a central computer 164, as shown in FIG. 2. Once the user has entered the preferred exercise program and associated parameters, the program and parameters can be saved in the central computer 164 via the communications board 162. Thus, during subsequent exercise sessions, the user can retrieve the saved program and parameters and can begin exercising without re-entering data. At the conclusion of an exercise program, the user's heart rate and total calories expended can be saved in the central computer 164 for future reference. Similarly, the central computer 164 can be used to save the total distance traveled along with the user's average miles per hour and minutes per mile pace during the exercise or these quantities can be tabulated to show the user's pace over the distance or time of the exercise. In addition, the communications board 162 can be used to compare distance traveled or pace for the purpose of comparison with other users on other step apparatus or even other types of exercise machines in real time in order, for example, to provide for simulated races between users.

In using the apparatus 10, the user begins his exercise session by first stepping on the pedal 12 which, as previously explained, is heavily damped due to the at-rest resistive force of the alternator 42. Once the user depresses the start/enter key 128, the alpha-numeric display screen 112 of the message center 110 prompts the user to enter the required information and to select among the various programs. First, the user is prompted to enter the user's weight. The alpha-numeric display screen 112, in conjunction with the display panel 136, then lists the exercise programs and prompts the user to select a program. Once a program is chosen, the alpha-numeric display screen 112 then prompts the user to provide program-specific information. For example, if the user has chosen the cardio program, the alpha-numeric display screen 112 prompts the user to enter the user's age. After the user has entered all the program-specific information such as age, weight and height, the user is prompted to specify the goal type (time or calories), to specify the desired exercise duration in either total time or total calories, and to choose one of the twenty-four exercise levels. Once the user has entered all the required parameters, the microprocessor 92 implements the selected exercise program based on the information provided by the user. When the user then operates the pedal 12 in the previously described manner, the pedal 12 moves along the elliptical pathway in a manner that simulates a natural heel to toe flexure that minimizes or eliminates stresses due to unnatural foot flexure. If the user employs the moving arm handle 80, the exercise apparatus 10 exercises the user's upper body concurrently with the user's lower body. The exercise apparatus 10 thus provides a wide variety of exercise programs that can be tailored to the specific needs and desires of individual users.

Elliptical Stepping Mechanism

In addition to measuring distance traveled on an elliptical exercise apparatus such as the apparatus 10 in FIG. 1 that has a fixed pedal path, the principles discussed above can apply to the calculation of distance traveled in an elliptical exercise apparatus that has an adjustable stride length. The ability to adjust the stride length in an elliptical step exercise apparatus is desirable for a number of reasons. First, people, especially people with different physical characteristics such as height, tend to have different stride lengths when walking or running. Secondly, the length of an individuals stride generally increases as the individual increases his walking or running speed. As suggested in U.S. Pat. Nos. 5,743,834 and 6,027,431, there are a number of mechanisms for changing the geometry of an elliptical step mechanism in order to vary the path the foot follows in this type of apparatus.

Stride Length Adjustment Mechanisms

The ability to adjust the stride length in an elliptical step exercise apparatus is desirable for a number of reasons. First, people, especially people with different physical characteristics such as height, tend to have different stride lengths when walking or running. Secondly, the length of an individuals stride generally increases as the individual increases his walking or running speed. As suggested in U.S. Pat. Nos. 5,743,834 and 6,027,431, there are a number of mechanisms for changing the geometry of an elliptical step mechanism in order to vary the path the foot follows in this type of apparatus.

FIGS. 4-7, 8A-D, 9A-D and 10A-D depict a pair of stride adjustment mechanisms 166 and 166' which can be used to vary the stride length, i.e. maximum foot pedal displacement, without the need to adjust the length crank 68. Essentially, the stride adjustment mechanisms 166 and 166' replace the stroke link used to move the pedal lever 50 in earlier machines of the type shown in FIG. 1. This approach permits adjustment of stride length independent of the motion of the machine 10 regardless as to whether the machine 10 is stationary, the user is pedaling forward, or pedaling in reverse. One of the significant features of the stride adjustment mechanisms 166 and 166' is a dynamic link, that is, a linkage system that changes its length, or the distance between its two attachment points, cyclically during the motion of the apparatus 10. The stride adjustment mechanisms 166 and 166' are pivotally attached to the pedal lever 50 by a link crank mechanism 168 at one end and pivotally attached to the crank extension 72 at the other end. The maximum pedal lever's 50 excursion, for a particular setting, is called a stroke or stride. The stride adjustment mechanism 166 and the main crank 68 with the crank extension 72 together drive the maximum displacement/stroke of the pedal lever 50. The extreme points in each pedal lever stroke correspond to extreme points between the Main Crank Axis 40 and a Link Crank—Pedal Lever Axis 169. By changing the dynamic phase angle relationship between the link crank 168 and the crank extension 72, it is possible to add to or subtract from the maximum displacement/stroke of the pedal lever 50. Therefore by varying the dynamic phase angle relationship between the link crank 168 and the crank extension 72, the stroke or stride of the pedal lever 50 varies the length of the major axis of the ellipse that the foot pedal 12 travels.

Figure 4:
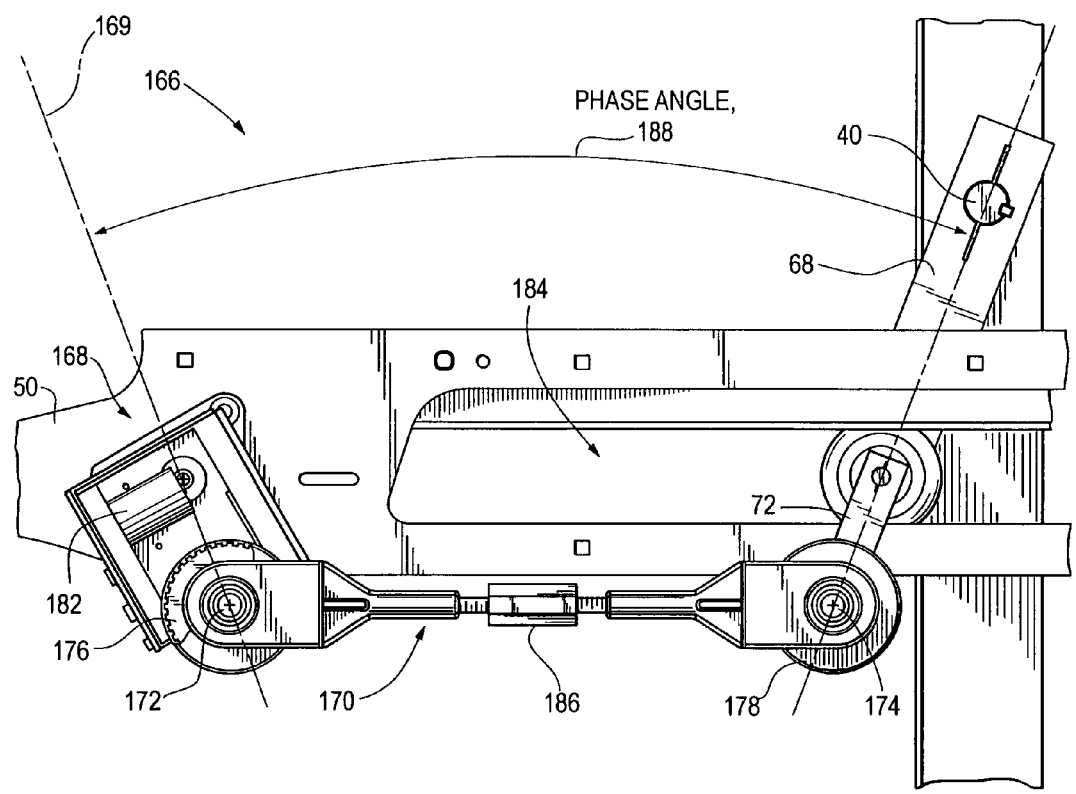
FIGS. 4 and 5 are views of the preferred embodiment of dynamic link mechanism for use in adjusting stride length in an elliptical stepping apparatus of the type shown in FIG. 1.
Figure 5:
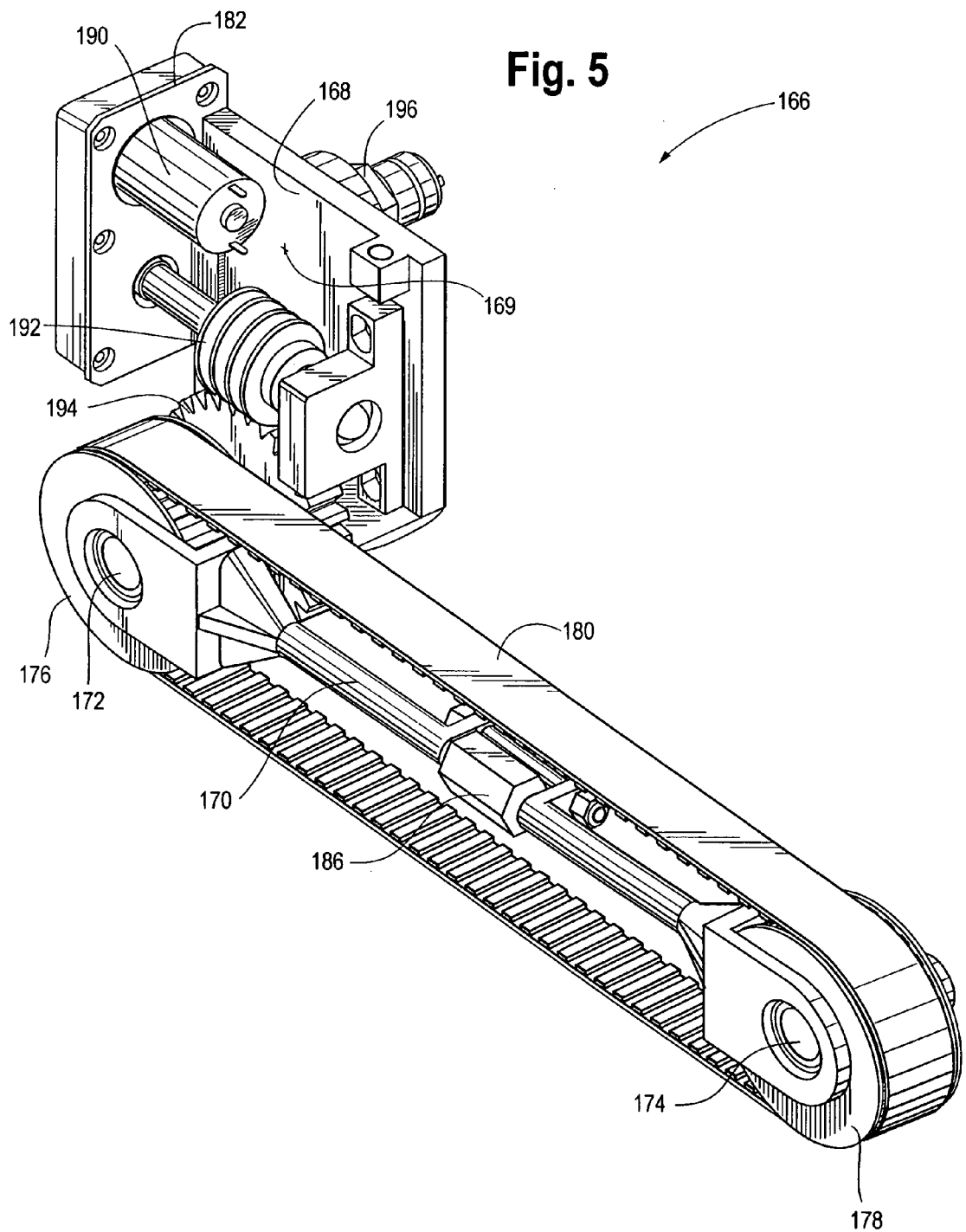
Figure 18:
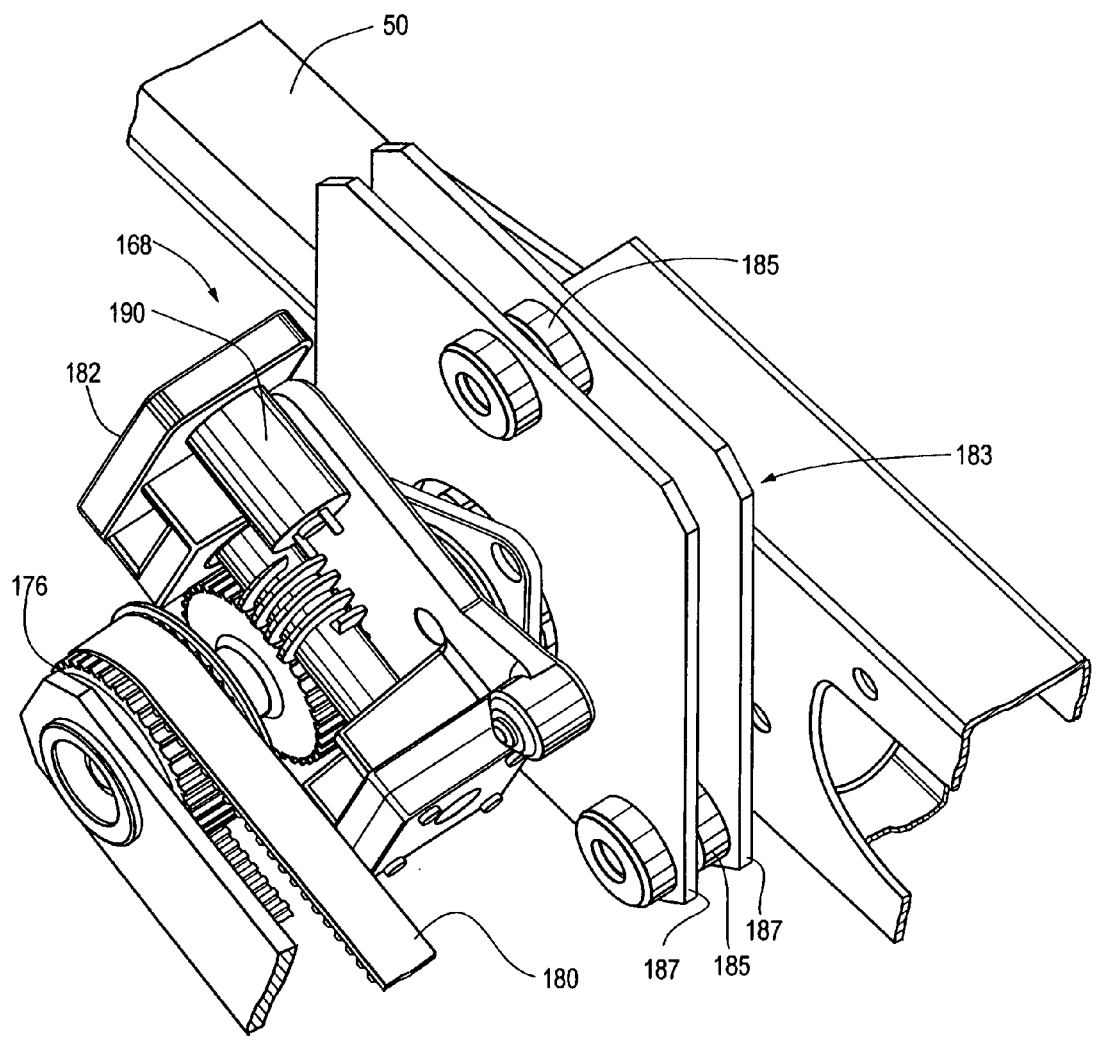
FIG. 18 is perspective view of mounting assembly for use with the dynamic link mechanism of FIGS. 4 and 5.

The preferred embodiment of the stride adjustment mechanism 166 shown in FIGS. 4 and 5 takes full advantage of the relative rotation between the crank extension 72 and a control link assembly 170 of the stride adjustment mechanism 166 as the user moves the pedals 12. In this embodiment, attachment adjustment mechanism 166 includes the control link assembly 170 and two secondary crank arms, the link crank assembly 168 and the crank extension 72. The control link assembly 170 includes a pair of driven timing-pulley shafts 172 and 174, a pair of toothed timing-pulleys 176 and 178 and a toothed timing-belt 180 engaged with the timing pulleys 176 and 178. For clarity, the timing belt is not shown in FIG. 4 but is shown in FIG. 5. Also included in the link crank assembly 168 is a link crank actuator 182. One end of the crank-extension 72 is rigidly attached to the main crank 68. The other end of the crank-extension 72 is rigidly attached to the rear driven timing-pulley shaft 174 and the pulley 178. Also, the rear driven timing-pulley shaft 174 is rotationally attached to the rearward end of the control link assembly 170. The forward end of the control link assembly 170 is rotationally attached to the forward driven timing-pulley shaft 172 and pulley 176. The two timing-pulleys 176 and 178 are connected to each other via the timing-belt 180. The forward driven timing-pulley shaft 172 is pivotally attached to the link crank 168, but held in a fixed position by the link crank actuator 182 when the actuator 182 is stationary; the link crank 168 operates as if it were rigidly attached to the forward driven timing-pulley shaft 172. The other end of the link crank 168 is pivotally attached to the pedal lever 50 at the pivot axle 169. As an alternative to directly connecting the a link crank mechanism 168 directly to the pedal lever 50, a method of attachment to reduce the effects of misalignment can be used such as a compliant mounting assembly 183 as shown in FIG. 18. In this case, the compliant mounting assembly 183 includes a number of resilient components indicated at 185 secured between a pair of support plates 187 that absorb and compensate for any misalignment between the main crank 68 and the pedal lever 50. In this particular embodiment of the elliptical step apparatus 10 shown in FIGS. 4 and 5, the main crank 68 via a revolute joint on a linear slot supports the rearward end of the pedal lever 50. Here, this is in the form of a roller & track interface indicated generally at 184. When the apparatus 10 is put in motion, there is relative rotation between the crank extension/rearward timing-pulley 178 and the control link 170. This timing-pulley rotation drives the forward driven timing-pulley 176 via the timing-belt 180. Since the forward driven timing-pulley 176 is rigidly attached to one end of the link crank 168, the link crank 168 rotates relative to the pedal lever 50. Because the control link 170 is a rigid body, the rotation of the link crank 168 moves the pedal lever 50 in a prescribed motion on its support system 184. In order to facilitate installation, removal and tension adjustment of the belt 180 on the pulleys 176 and 178, the control link 170 includes an adjustment device such as a turnbuckle 186 that can be used to selectively shorten or lengthen the distance between the pulleys 176 and 178.

In this mechanism 166, there exists a relative angle indicated by an arrow 188 shown in FIG. 4 between the link crank 202 and the crank extension 70. This relative angle 188 is referred to as the LC-CE phase angle. When the link crank actuator 182 is stationary, the LC-CE phase angle 188 remains constant, even if the machine 10 is in motion. When the actuator 182 is activated, the LC-CE phase angle 188 changes independent of the motion of the machine 10. Varying the LC-CE phase angle 188 effects a change in the motion of the pedals 10, in this case, changing the stride length.

In the embodiment, shown in FIG. 5, the link crank actuator 182 includes a gear-motor, preferably an integrated motor and gearbox 190, a worm shaft 192, and a worm gear 194. Because the link crank actuator 190 rotates about an axis relative to the pedal lever 50, a conventional slip-ring type device 196 is preferably used to supply electrical power, from for example the power control board 94 shown in FIG. 2, across this rotary interface to the DC motor of the gear-motor 190. When power is applied to the gear-motor 190, the worm shaft 192 and the worm gear 194 rotate. The rotating worm shaft 192 rotates the worm gear 194, which is rigidly connected to the driven timing pulley 176. In addition, the worm gear 194 and the forward pulley 176 rotate relative to the link crank 168 to effect the LC-CE Phase Angle 188 change between the crank extension 72 and the link crank 168. A reverse phase angle change occurs when the motor 190 is reversed causing a reverse stride change, that is, a decrease in stride length. In this embodiment, less than half of the 360 degrees of the possible phase angle relationship between the link crank 168 and the crank extension 72 is used. In some mechanisms using more or the full range of possible phase angles may provide different and desirable ellipse shapes.

Figure 6:
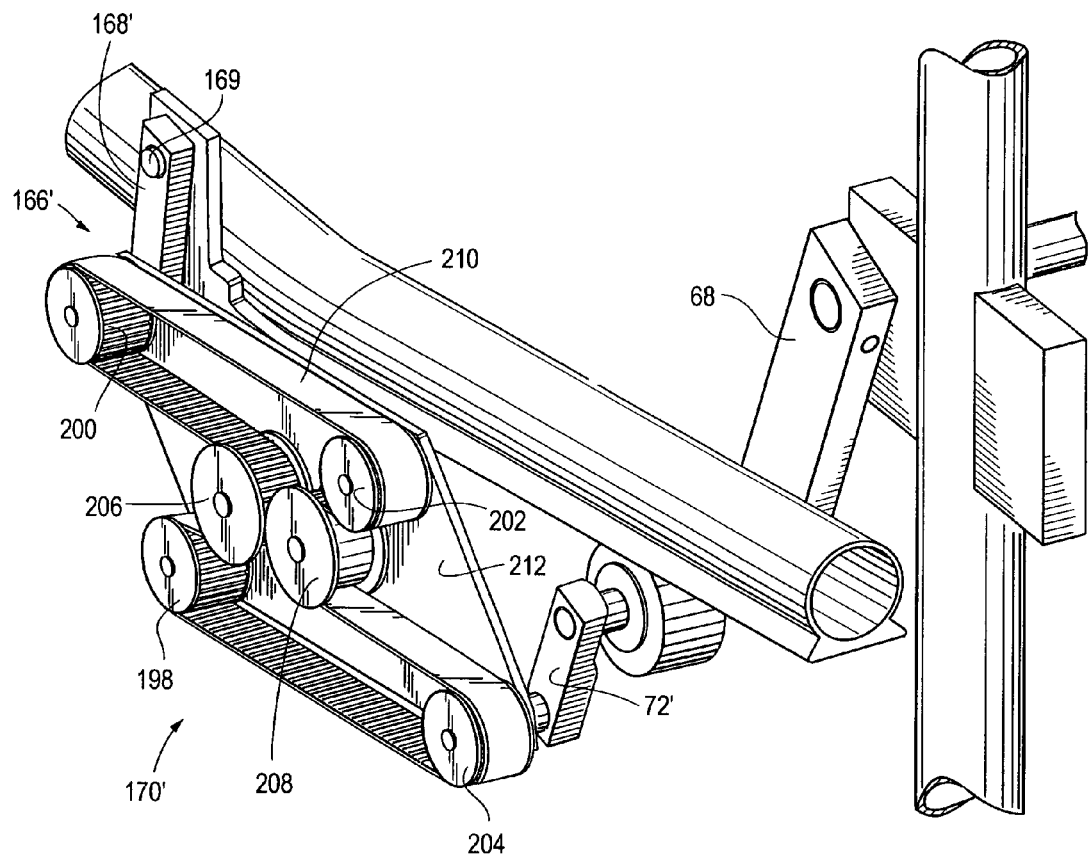
FIGS. 6 and 7 are views of the secondary embodiment of dynamic link mechanism for use in adjusting the stride length in an elliptical stepping apparatus of the type shown in FIG. 1.
Figure 7:
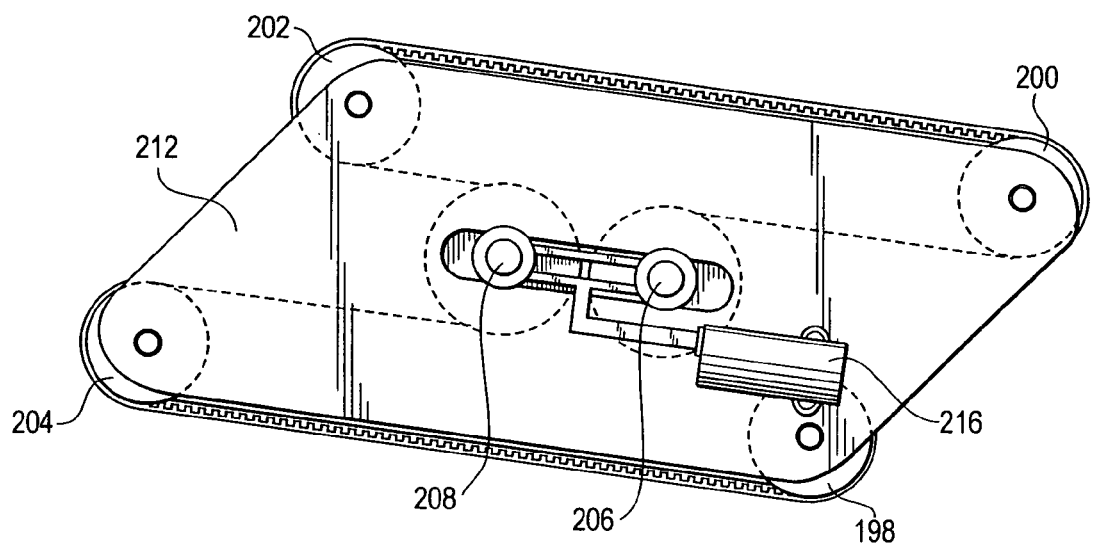

Another embodiment of the stride adjustment mechanism 166', shown in FIGS. 6 and 7 of the invention takes similar advantage of the relative rotation between the crank extension 72 and a control link assembly 170' of the stride adjustment mechanism 166' as the user moves the pedals 12. In this embodiment, the stride adjustment mechanism 166' includes the control link assembly 170', the link crank assembly 168' and the crank extension 72'. The control link assembly 170' includes a set of four toothed timing pulleys 198, 200, 202, 204, a pair of back-side idler pulleys, 206 and 208, and a toothed timing-belt 210 engaged with the all six pulleys. All of the pulleys are rotationally attached to the control link plate 212. The back-side idler pulleys, 206 and 208, are rigidly connected to each other through a slot 214 in the control link plate 212, as shown in FIG. 7 which is a backside view of the control link assembly 170' of FIG. 6. Being rigidly connected, the back-side idler pulleys 206 and 208 can move as a pair along the slot 214. Also included in the control link assembly 170' is a linear actuator 216. One end of the crank-extension 72 is rigidly attached to the main crank 68. The other end of the crank-extension 72 is rigidly attached to the rear timing-pulley 204. Also, the rear timing-pulley 204 is rotationally attached to the rearward end of the control link assembly 170'. The forward end of the control link assembly 170' is rotationally attached to the forward timing-pulley 200. The forward timing-pulley 200 is pivotally attached to the link crank 168', but held in a fixed position by the linear actuator 216 when the actuator 216 is stationary. In this case, the link crank 168' operates as if it were rigidly attached to the forward timing-pulley 200. The other end of the link crank 168' is pivotally attached to the pedal lever. When the apparatus 10 is put in motion, there is relative rotation between the crank extension 72' rearward timing-pulley 204 and the control link 170'. This timing-pulley rotation drives the forward driven timing-pulley 200 via the timing-belt 210. Since the forward driven timing-pulley 200 is rigidly attached to one end of the link crank 168', the link crank 168' rotates relative to the pedal lever 50. Because the control link 170' is a rigid body, the rotation of the link crank 168' moves the pedal lever 50 in a prescribed motion on its support system.

Figure 8C:
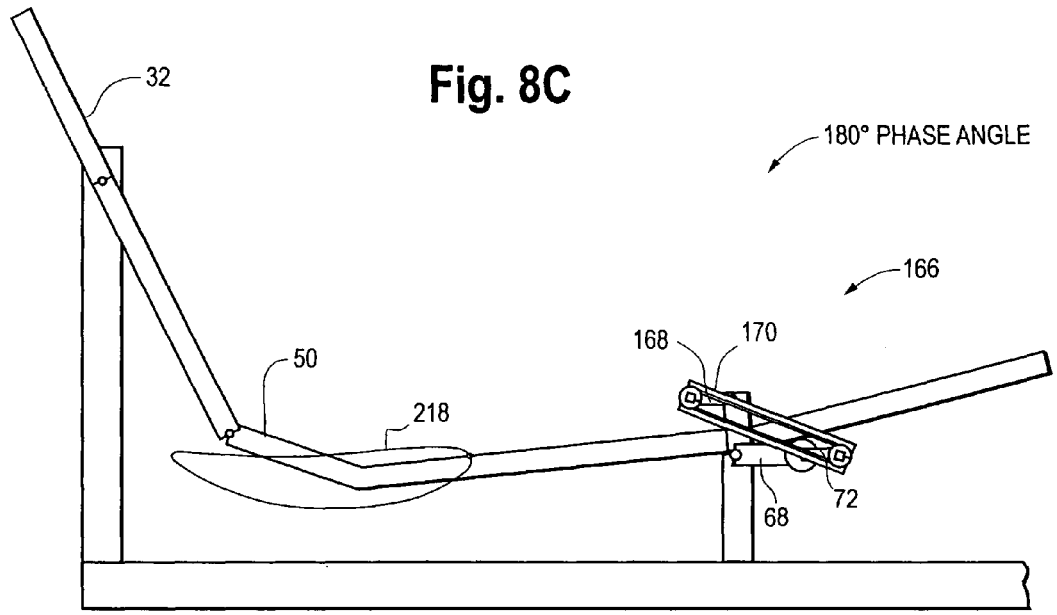
Figure 8D:
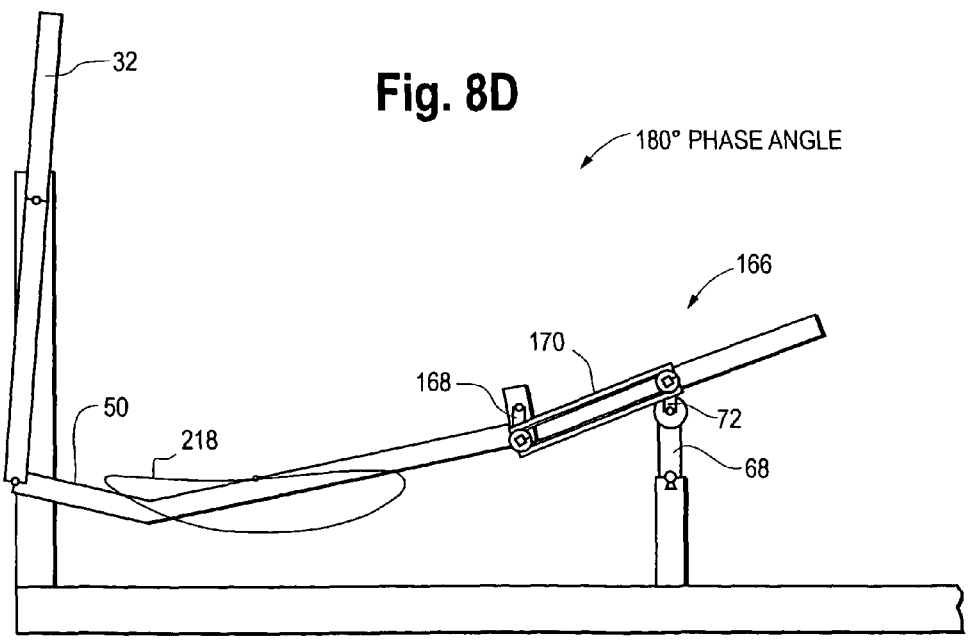
Figure 9A:
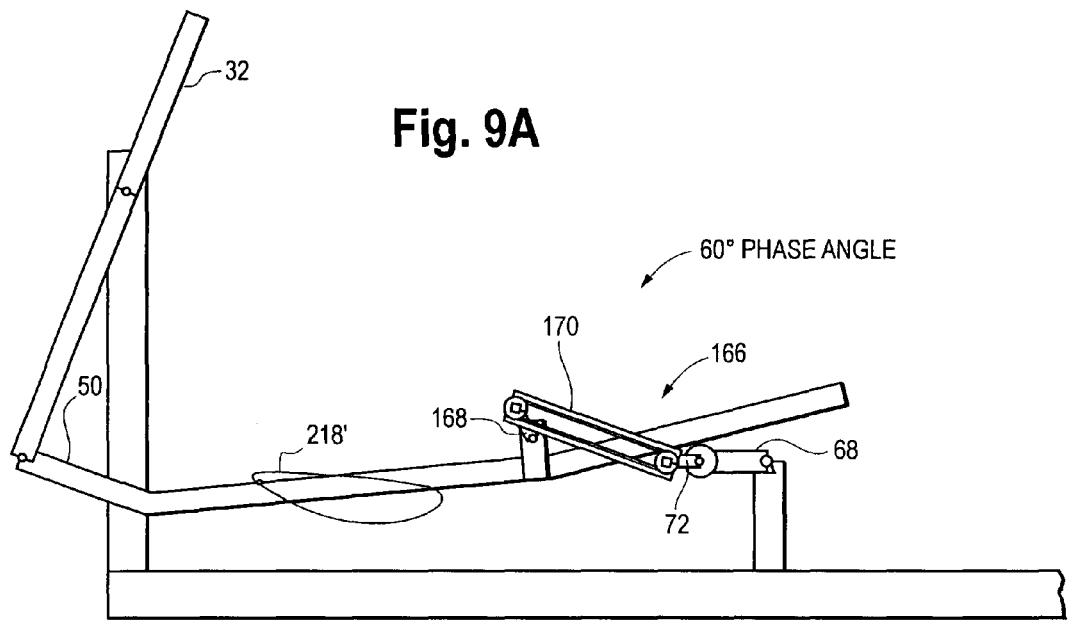
FIGS. 9A, 9B, 9C and 9D are schematic diagrams illustrating the operation of the dynamic link mechanism of FIGS. 4-7 for a 60 degree phase angle.
Figure 9B:
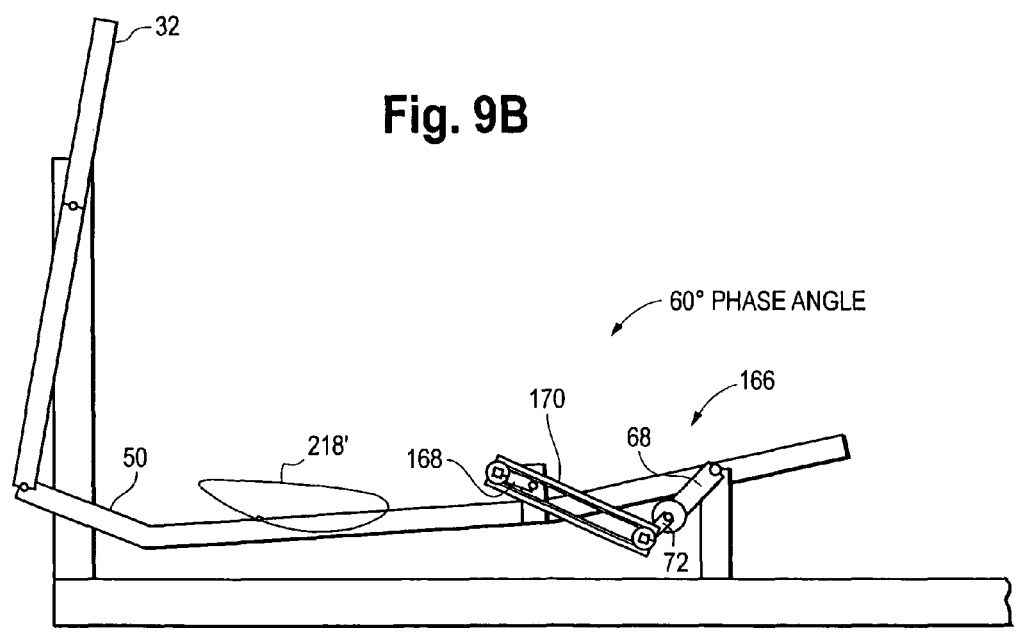
Figure 9C:
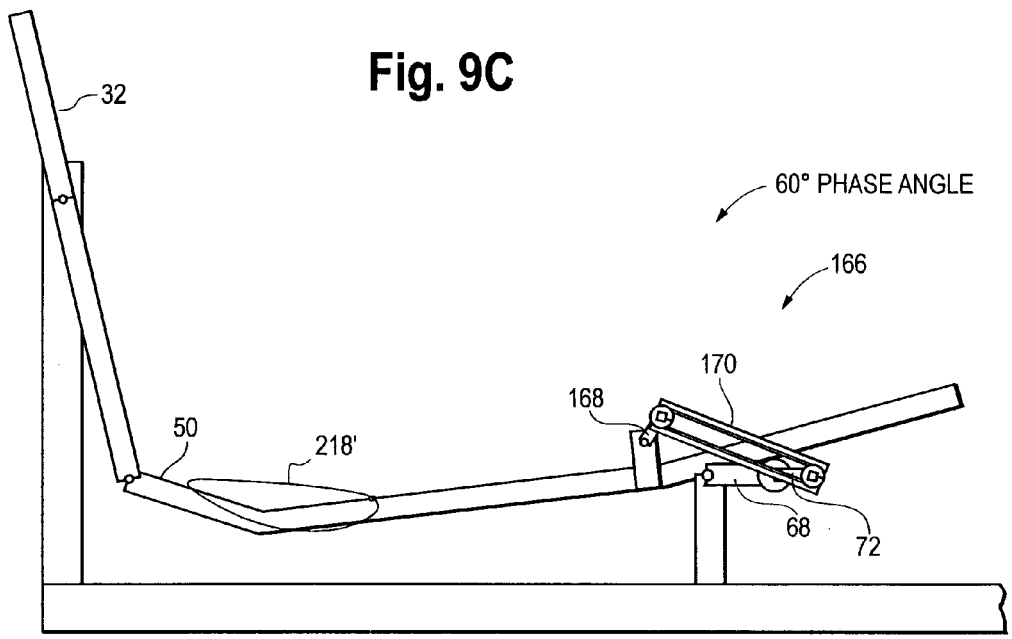
Figure 9D:
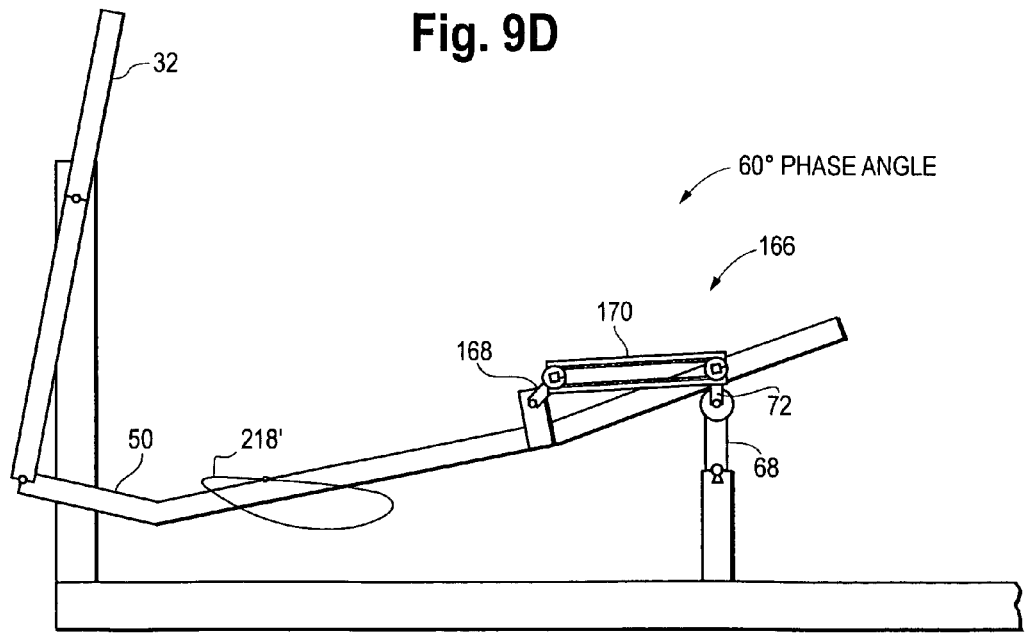
Figure 10A:
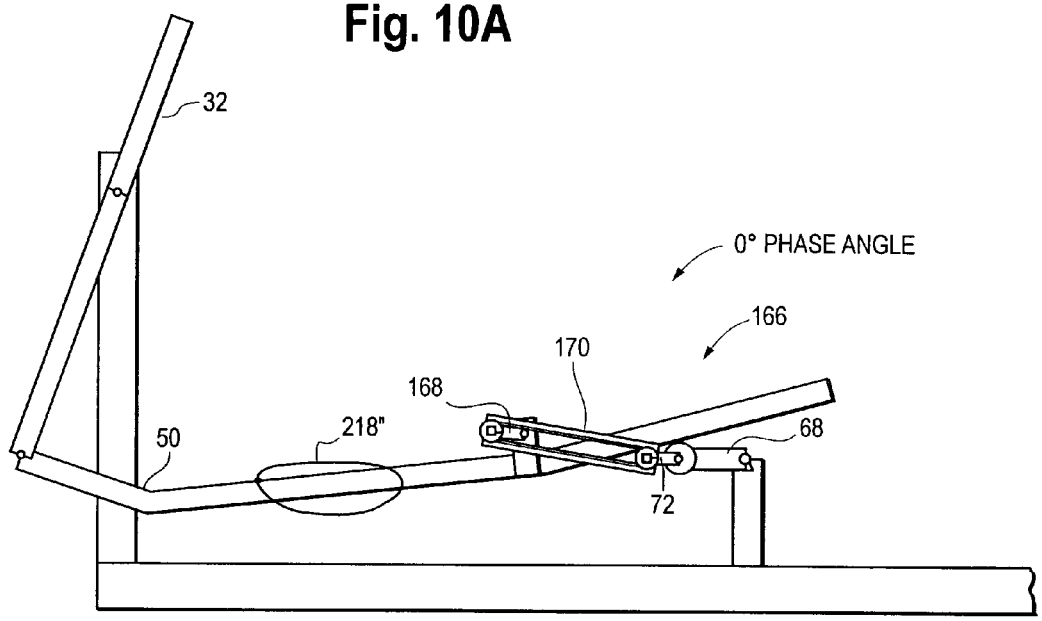
FIGS. 10A, 10B 10C and 10D are schematic diagrams illustrating the operation of the dynamic link mechanism of FIGS. 4-7 for a zero degree phase angle.
Figure 10B:
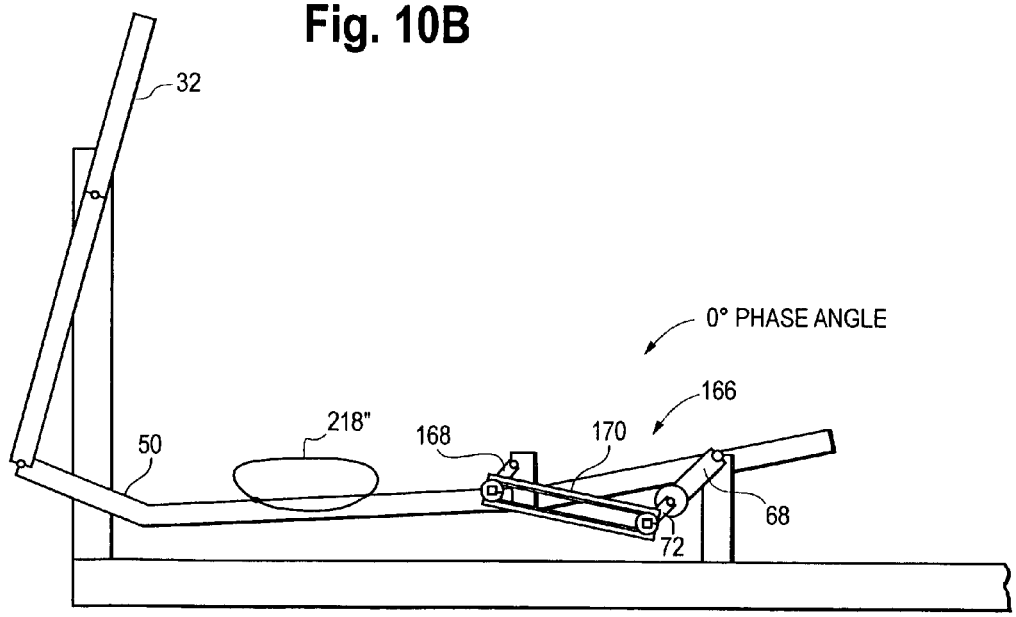
Figure 10C:
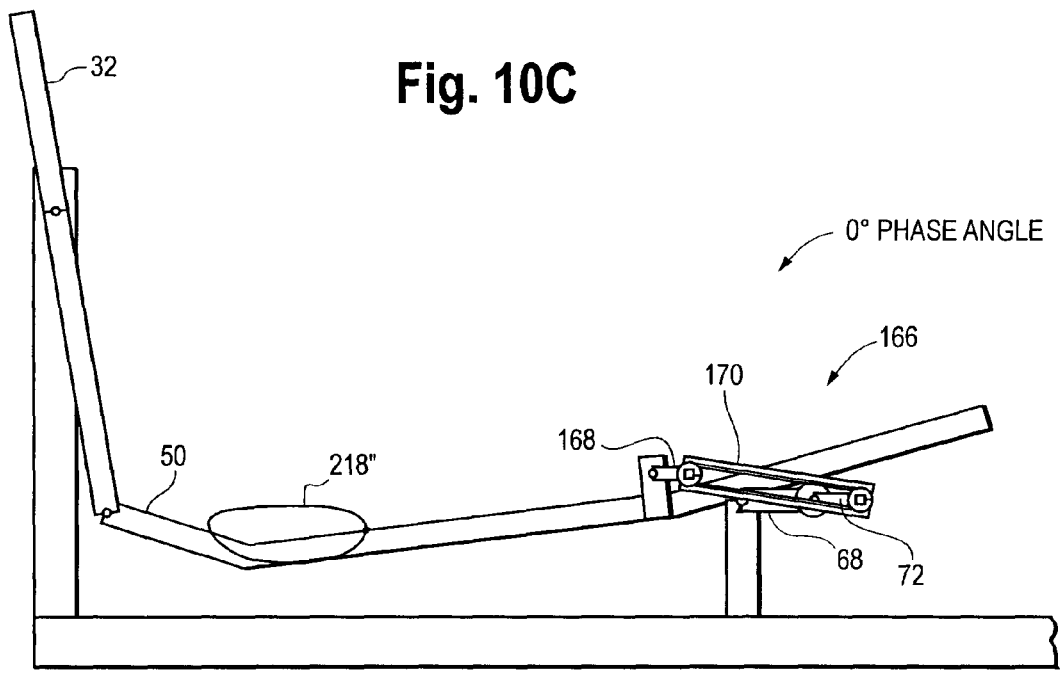
Figure 10D:
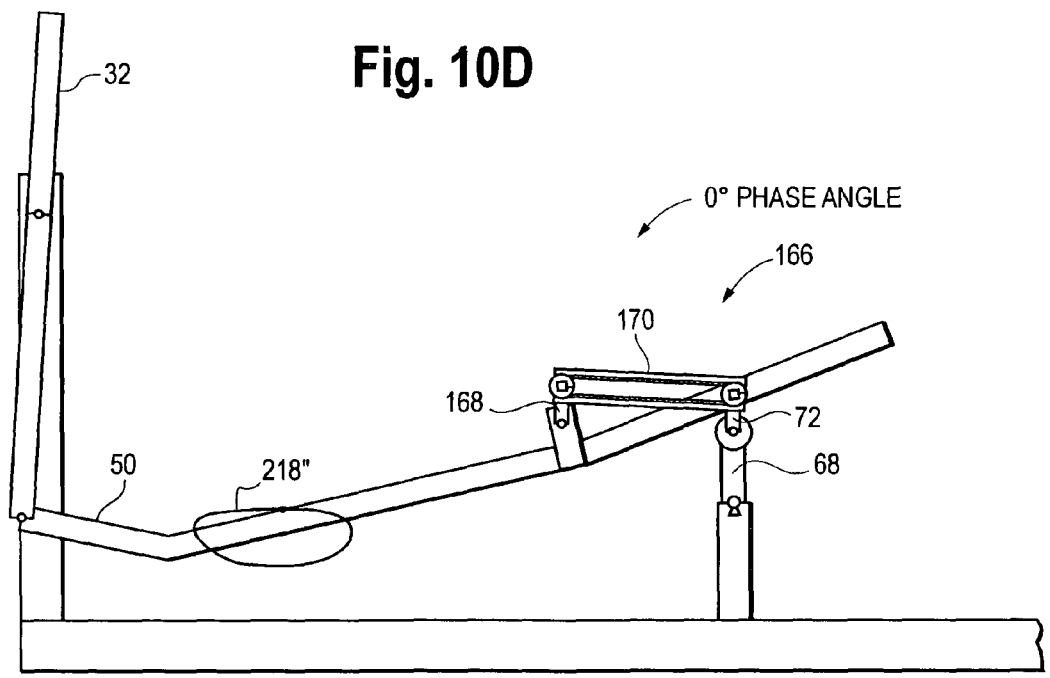

The schematics of FIGS. 8A-D, 9A-D and 10A-D illustrate the effect of the phase angle change between the crank extension 72 and the link crank 168 for a 180 degree, a 60 degree and a 0 degree phase relationship respectively. Also, FIGS. 8A, 9A, and 10A display the crank at 180 degree position; FIGS. 8B, 9B, and 10B show the crank at 225 degree position; FIGS. 8C, 9C, and 10C show the crank at a 0 degree position; and FIGS. 8D, 9D, and 10D show the crank at a 90 degree position. In FIGS. 8A-D the elliptical path 218 represents the path of the pedal 12 for the longest stride; in FIGS. 9A-D the elliptical path 218' represents the path of the pedal 12 for an intermediate stride; and in FIGS. 10A-D the elliptical path 218'' represents the path of the pedal 12 for the shortest stride.

In certain circumstances, characteristics of stride adjustment mechanisms of the type 166 and 166' can result in some undesirable effects. Therefore, it might be desirable to implement various modifications to reduce the effects of these phenomena. For example, when the stride adjustment mechanism 166 is adjusted to the maximum stroke/stride setting, the LC-CE Phase Angle is 180 degrees. At this 180-degree LC-CE Phase Angle setting, the components of the stride adjustment mechanism 166 will pass through a collinear or toggle condition. This collinear condition occurs at or near the maximum forward excursion of the pedal lever 50, which is at or near a maximum acceleration magnitude of the pedal lever 50. At slow pedal speeds, the horizontal acceleration forces are relatively low. As pedal lever speeds increase, effects of the condition increase in magnitude proportional to the change in speed. Eventually, this condition can produces soft jerk instead of a smooth transition from forward motion to rearward motion. To overcome this potential problem several approaches can be taken including: limit the maximum LC-CE phase angle 188 to less than 180 degrees, for example, restrict stride range to 95% of mechanical maximum; change the prescribed path shape 218 of the foot pedal 12; or reduce the mass of the moving components in the stride adjustment mechanism 166 and the pedal levers 50 to reduce the acceleration forces.

Another problem can occur when the stride adjustment mechanism 166 is in motion and where the tension side of the timing-belt 180 alternates between the top portion and the lower portion. This can be described as the tension in the belt 180 changing cyclically during the motion of the mechanism 166. At slow speeds, the effect of the cyclic belt tension magnitude is relatively low. At higher speeds, this condition can produce a soft bump perception in the motion of the machine 10 as the belt 180 quickly tenses and quickly relaxes cyclically. Approaches to dealing with this belt tension problem can include: increase the timing-belt tension using for example the turnbuckle 186 until the bump perception is dampened; increase the stiffness of the belt 180; increase the bending stiffness of the control link assembly 170; and install an active tensioner device for the belt 180.

Figure 11:
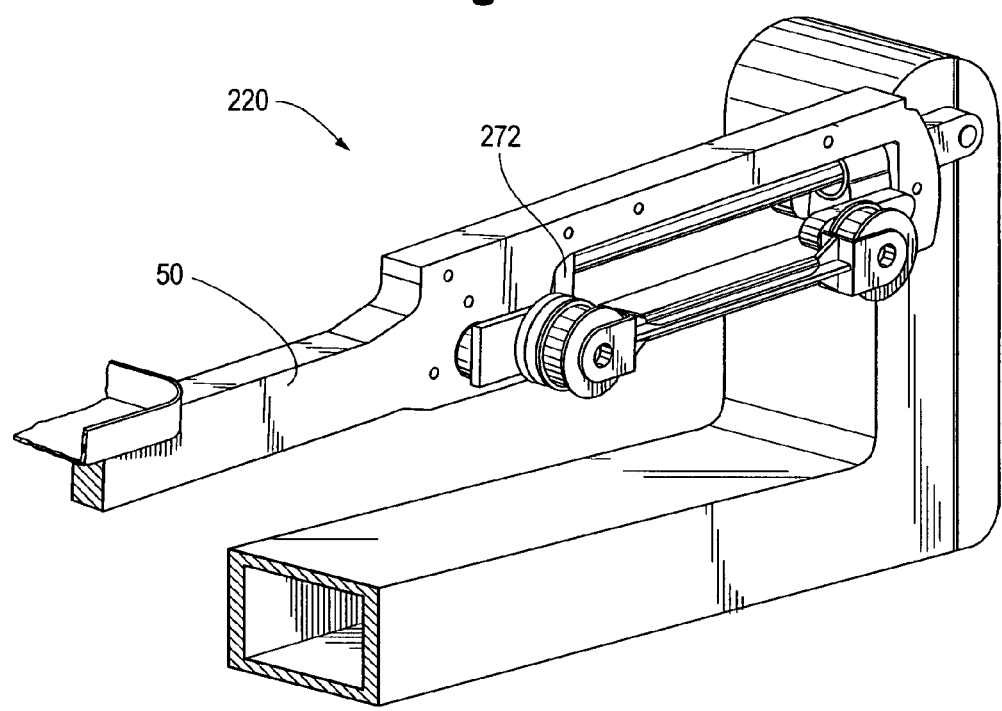
FIG. 11 is a pair of perspective view of a linear guide assembly for use with the mechanisms of FIGS. 4-7.

A further problem can occur when the stride adjustment mechanism 166 is in motion where a vertical force acts on the pedal lever 50. The magnitude of this force changes cyclically during the motion of the mechanism 10. At long strides and relatively high pedal speeds, this force can be sufficient to cause the pedal lever 50 to momentarily lift off its rearward support roller 70. This potential problem can be addressed in a number of ways including: install a restrained rearward support such as a linear bearing and shaft system, linear guides rail system 220, as shown in FIG. 11, roller-trammel system 184, as shown in FIG. 4; limit the maximum LC-CE phase angle 188 to less than 180 degrees; restrict stride range to 95% of mechanical maximum; and reduce the mass of the moving components in the stride adjustment mechanism and the pedal levers.

Figure 12:
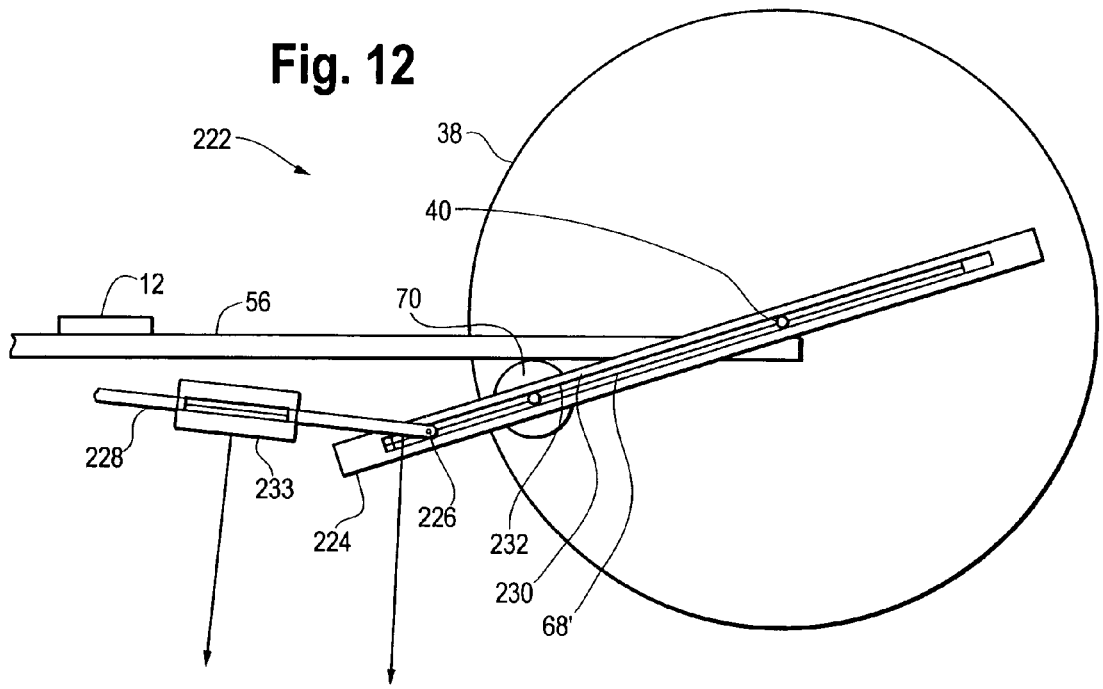
FIG. 12 is a view of an additional embodiment for a stride adjustment mechanism.

A third embodiment to modify stride length, as illustrated in FIG. 12, is a pedal actuation assembly 222. In this case, an extension arm 224 extends directly from a crank 68'. Because the extension arm 224 extends to and beyond the pivot axle 40, it is possible to move a pivotal connection point 226 of the stroke link 228 along the extension arm 224, by a mechanism or actuator depicted at 230 in a slot 232, and along the crank 68' to the pivot axle 40. When the connection point 226 is aligned with the pivot axle 40 the pedal lever 50 will not move in a longitudinal direction thus resulting in a purely vertical movement of the foot pedal 12. If the pivot point 226 is moved past the axle 40, the foot pedal 12 moves in a longitudinal direction opposite of the arm handles 80 shown in FIG. 1. As a result, the pedal actuation assembly 222 provides added flexibility to an elliptical step apparatus. An alternate method of providing a stride adjustment capability in the pedal actuation assembly 222 is to fit an actuator 233 to the stroke link 228. The actuator 233 can adjust the length of the stroke link 228, thus changing the distance between a fixed point on the pedal lever 50 and the crank 68' which would change the stride length of the elliptical path 218.

Figure 13:
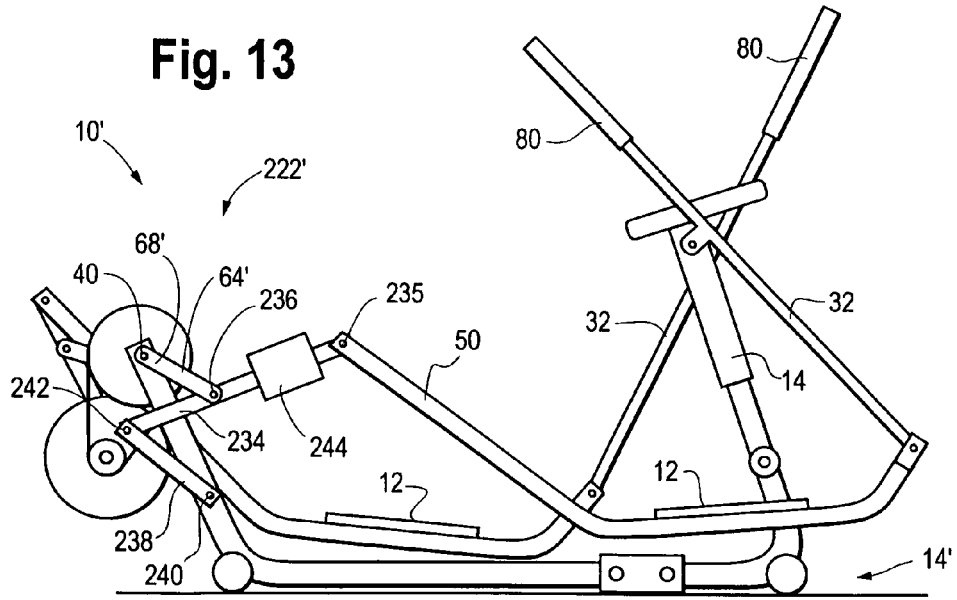
FIG. 13 is a side view of the elliptical exercise apparatus with a different stride adjustment mechanism than shown in FIG. 1.

FIG. 13 illustrates another elliptical step apparatus 10' having a modified pedal actuation assembly 222'. Included in the pedal actuation assembly 222' is a first link 234 pivotally connected to the pedal lever 50 at a pivot point 235 and to a crank 68' at a pivot point 236. A second link 238 is pivotally connected at one end to the frame 14' at a pivot 240 and at its other end to the first link 234 at a pivot point 242. A detailed description of the operation of this type of actuation assembly 222' is provided in U.S. Pat. No. 5,895,339. Stride adjustment is provided by a mechanism such as an actuator 244 fitted on the first link 234. By adjusting the mechanism 244 to increase the length of the first link 234, the length of the horizontal movement of the pedals 12 can be increased.

Figure 14:
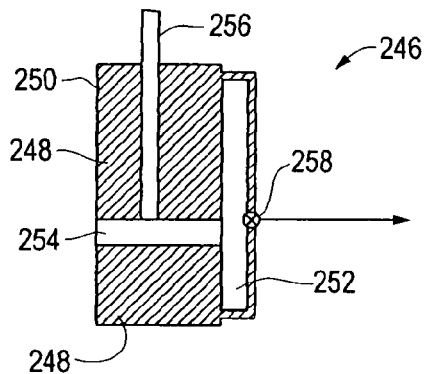
FIG. 14-16 are views of different actuators for use in the stride adjustment mechanisms.
Figure 15:
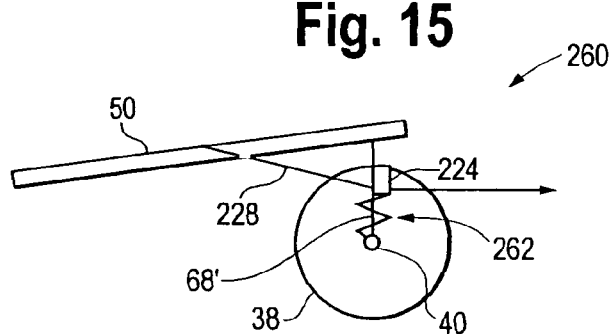
Figure 16:
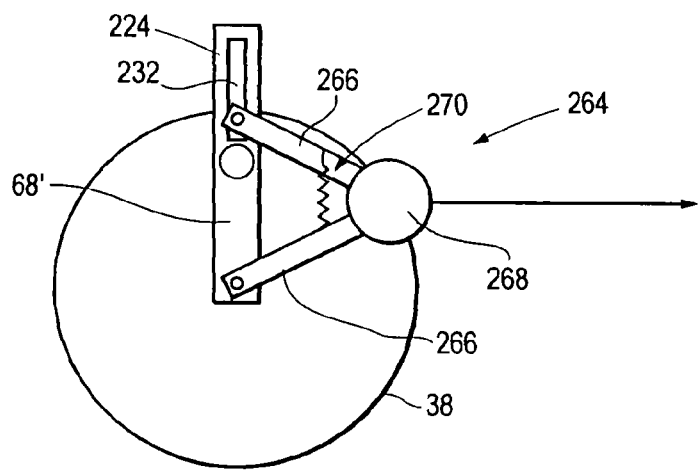

In addition to manually operable mechanisms such as a pin and hole arrangement, there are a number of electorally operated actuators can be used for the actuators 230, 233 and 244. FIGS. 14-16 provide additional examples of such actuators.

FIG. 14 is a schematic view of a first actuator 246 that can be mounted for example on the extension arm 224 or the crank 68' of the pedal actuation assembly 222 of FIG. 12. In this actuator 246, a hydraulic fluid indicated at 248 contained in a cylinder 250 flows through a line 252 to control the position of a piston 254 in the piston cylinder 256 which in turn is connected to the extension arm 224 or the crank 68' by a piston rod 256. Flow of the fluid 248 is regulated by a valve 258. In the preferred embodiment of this actuator 246, the valve is opened when the extension arm 224 or the crank 68' is under tension and closed when they are under compression. This will serve to lengthen the extension arm 224 or the crank 68' thereby increasing stride length. Reducing the length of the extension arm 224 or the crank 68' is accomplished by reversing the process. It should be noted that variations on this actuator 246 can be used such as replacing the hydraulic fluid 248 with a pheonetic magnetic fluid where the fluid is controlled by a flow channel in the piston 254. One advantage of this actuator 246 is that it does not require a source of outside energy to move the piston 254 but only enough energy to operate the valve 258. This type of actuator can be especially useful in self powered apparatus where power is only obtained from the alternator 42 when a user is moving the pedals 12.

FIG. 15 is a schematic view of a second actuator 260 mounted for example on the extension arm 224 or the crank 68' of the pedal actuation assembly 222. In this embodiment, a spring 262 is attached to extension arm 224 and to the end the crank 68'. To increase stride length, a switch or latch (not shown) is opened and the point of attachment of the extension arm 224 on the crank 68' moves outwardly due to centrifugal force as the pulley 38 rotates. To decrease stride length, the switch is opened when pulley 38 is not rotating or rotating very slowly and the spring will retract the extension arm 224 towards the pivot axle 40. As with the actuator 246, this actuator 260 can be used on a self powered machine.

FIG. 16 is a schematic view of a third actuator 264 that can be used for example on the pedal actuation assembly 222. In this embodiment a pair of extension links 266 are pivotally connected to the extension arm 224 and the crank 68'. A magnetic fluid control disk 268 controls the separation of the extension links 266 and therefore the connection point 232 of the extension arm 224 on the crank 68'. As with the actuators 246, centrifugal force will move the extension arm 224 outwardly along the crank 68' when the pulley 38 rotates on the axle 40 and the fluid disk 268 will then hold the extension links 266 and hence the extension arm 224 in place. Stride length can then be shortened when the pulley 38 is stopped and the fluid disk 268 permits a spring 270 to move the extension links 266 toward each other. As with the actuators 246 and 260, this actuator 264 can be used on a self powered machine.

Adjustable Stride Length Control

With reference to the control system 88 shown in FIG. 2, a mechanism is described whereby stride length can be controlled by the user or automatically modified in an elliptical step apparatus where stride length can be adjusted such as the type of machine 10 shown in FIG. 1. In one aspect of the invention stride length is adjusted to take into account the characteristics of the user or the exercise being performed. In the preferred embodiment of the invention, the control system 88 and the console 90 of FIG. 3 can be used to control stride length in the elliptical step exercise apparatus 10 either manually or as a function of a user or operating parameter. In FIG. 1 an attachment assembly generally represented within a dashed line 34 can be implemented by a number of mechanisms that provide for stride adjustment such as the stride adjustment mechanism 166 described above. It should also be noted that this aspect of the invention can be implemented using various other stride adjustment mechanisms such as those shown in FIGS. 12-16. As depicted in FIG. 2, a line 154 connects the microprocessor 92 to the attachment assembly 34 which in the case of the stride adjustment mechanism 166 would be the DC motor 190 as shown in FIG. 5. Stride length can then be varied by the user via a manual stride length key 156 which is connected to the microprocessor 92 via the data input center 104. Alternatively, the user can have stride length automatically varied by using a stride length auto key that is also connected to the microprocessor 92 via the data input center 104. In one embodiment, the microprocessor is programmed to respond to the speed signal on line 102 to increase the stride length as the speed of the pedals 12 increases. Pedal direction, as indicated by the speed signal can also be used to vary stride length. For example, if the microprocessor 92 determines that the user is stepping backward on the pedals 12, the stride length can be reduced since an individuals stride is usually shorter when stepping backward. Additionally, the microprocessor 92 can be programmed to vary stride length a function of other parameters such as resistive force generated by the alternator 42; heart rate measured by the sensors 140 and 140'; and user data such as weight and height entered into the console 90.

Another important aspect of the adjustable stride length control is a feedback mechanism to provide the processor 92 with information regarding the stride length of the apparatus 10. The measurement of stride length on an elliptical step apparatus can be important for a number of reasons including insuring that both pedal mechanisms have the same stride length. In the context of the apparatus 10 shown in FIG. 1 stride length information can be transmitted over the line 154 from the attachment assembly 34 to the processor 92.

There are a number of methods of acquiring stride length information the utility of which can be dependent on the particular mechanical arrangement of the elliptical step apparatus including the mechanism for adjusting stride length. The preferred method for obtaining this information from an apparatus employing the stride adjustment mechanism 166 involves the use of the link crank angle 188 as shown in FIG. 4. Referring to FIGS. 1 and 8A, the angular relation between the crank extension 72 and each of the link cranks 168 is proportional to the stride length. A sensor system such as reed switches and magnets can be mounted to each of the cranks 68 and feedback from each, along with the speed signal on the line 98 from the alternator 42, can be used by the processor 92 to calculate stride length of each pedal 12. The link crank 168 and crank extension 72 rotate with the same angular velocity because they are mechanically linked, but they can trigger their respective reed switches and magnets at different times depending on the link crank angle 188. For every revolution of the alternator 42, there are a set number of AC taps. The number of AC taps between the link crank 168 and the crank extension 72 triggering their respective reed switches and magnets can be made into a theoretical chart deriving link crank angle 188 and stride length.

With reference to FIG. 11, a second method involves using a linear encoder 272. This method uses the relative motion between the pedal lever 50 and a linear guide assembly 220 that replaces the roller 70 shown in FIG. 4. The linear guide 220 supports the pedal lever 50 during its travel. The distance that the linear guide 220 travels along the pedal lever 50 can be related to the stride length. The encoder 272 would reside on the pedal lever 50 and the movable mechanism for the encoder will be connected to the linear guide assembly 220. A sensor system can be placed on the pedal lever 50 and used as an index position. Then, for example, if 3 index pulses are generated, the crank 68 will have traveled one complete revolution. The distance traveled by the linear guide 220 can then be determined by adding the encoder pulses seen for every 3 index pulses and looking this up in a table that would be created. In this manner the stride length feedback signal can be provided to the processor 92.

Figure 17A:
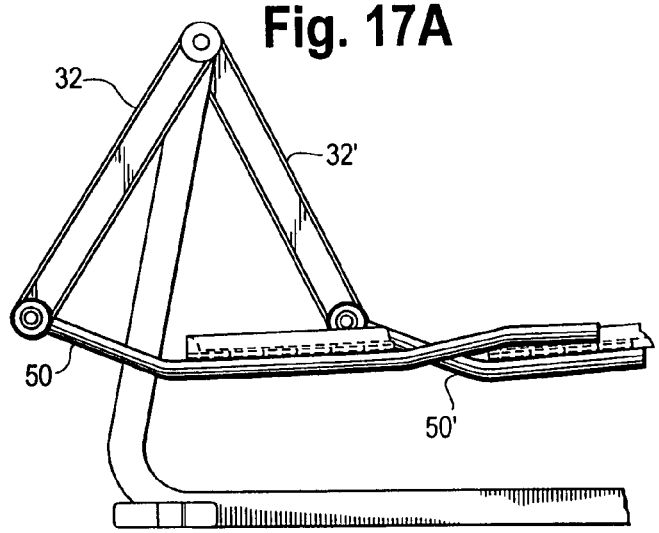
FIGS. 17A, 17B and 17C are a set of schematic diagrams illustrating angle measurements that can be used to determine stride length in an elliptical stepping apparatus of the type shown in FIG. 4.
Figure 17B:
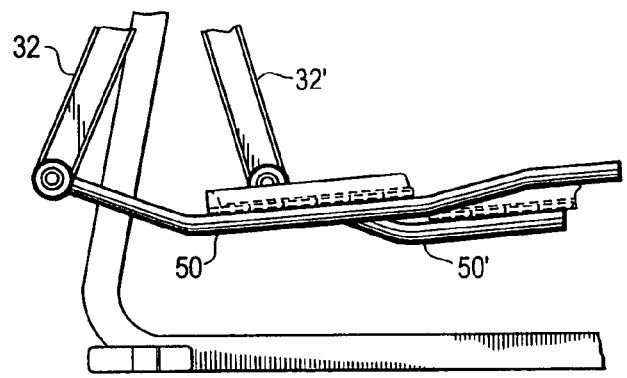
Figure 17C:
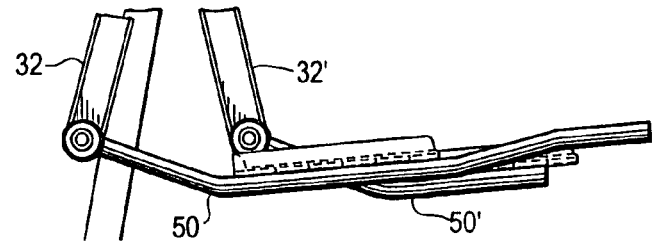

FIG. 17A-C provides an illustration of a third method of determining stride length. This method measures the maximum and minimum angle between the rocker arms 32 and 32' and pedal levers 50 and 50' respectively for various stride lengths. These angles, as shown in FIG. 17A-C can then be used to determine the stride length of the pedal 12 from this angular information. Commercially available shaft angle encoders can be mounted at the pivot points between the pedal levers 50 and 50' and the rocker arms 32 and 32'.

A fourth method of determining stride length can make use of the speed of the pedal lever 50. This method measures the speed of the pedal 12 using the tachometer signal on the line 98 through fastest point of travel on the elliptical path 218 which changes with stride length. The pedal speed at the bottom most point of travel on the ellipse will increase as stride length increases. For example, the speed of the pedal 12 can be measured by placing 2 magnets on the pedal 12 twelve inches apart such that the two magnets will cross a certain point in space close to the bottom most point of pedal travel. A sensor can then be placed at that point in space (in the middle of the unit) such that each magnet will trigger the sensor. The number of AC Tap pulses on line 98 for example received between the two sensor activation signals can be measured and thus the stride length calculated. A Hall effect sensor can be used as the sensor.

We claim:

1. An exercise apparatus comprising:
   a frame;
   a pivot axle supported by said frame;
   a control system;
   a first pedal lever including a first, a central and a second portion;
   a first and second rocker;
   a second pedal lever; including a first, a central and a second portion;
   a first pedal, secured to said central portion of said first pedal lever;
   a second pedal, secured to said central portion of said second pedal lever;
   a first crank rotationally connected to said pivot axle;
   a second crank rotationally connected to said pivot axle;
   a first and second stride adjustment mechanism, operatively associated with said first and second pedal levers and said first and second cranks effective to change the horizontal portion of the elliptical path of said first and second pedal lever thereby altering the stride length of said first and second pedal levers; and
   a first and second sensor mechanism operatively connected to said control system including a first and a second sensor operatively associated with each of said pedal levers respectively for generating a first stride length signal representing the stride length of said first pedal lever and a second stride length signal representing the stride length of said second pedal lever.

2. The apparatus of claim 1 wherein the apparatus includes a user input system and said control system operatively connected to said user input system and wherein said first and second stride adjustment mechanisms include an actuator operatively connected to said control system for altering the stride length of said first and second pedal levers in response to stride signals from said user input system.

3. The apparatus of claim 1 wherein the apparatus additionally includes a speed sensor operatively connected to said control system for sensing the speed of movement of said pedal and wherein said control system is effective to cause said stride adjustment mechanism to change the horizontal portion of said elliptical path with an increase in said pedal speed.

4. The apparatus of claim 1 additionally including a stride length key operatively connected to said control system wherein said control system permits a user to select a stride length utilizing said stride length key.

5. The apparatus of claim 1 wherein said first and second stride adjustment mechanisms each include a dynamic link pivotally secured to said crank and a link crank pivotally secured to said second portion of said pedal lever such that the distance between the attachment to said crank and the attachment to said pedal lever changes cyclically as said crank rotates and wherein said first and second sensors are activated by magnets located on said first and second crank and on said first and second link crank.

6. The apparatus of claim 1 wherein said first and second stride adjustment mechanisms each include a dynamic link pivotally secured to said crank and a link crank pivotally secured to said second portion of said pedal lever such that the distance between the attachment to said crank and the attachment to said pedal lever changes cyclically as said crank rotates and wherein said first and second sensors are activated by reed switches located on said first and second crank and on said first and second link crank.

7. The apparatus of claim 1 wherein said first and second stride adjustment mechanisms each include a dynamic link pivotally secured to said crank and a link crank pivotally secured to said second portion of said pedal lever such that the distance between the attachment to said crank and the attachment to said pedal lever changes cyclically as said crank rotates and wherein said sensors are operatively connected to said control system effective to calculate the phase between said first crank and said first link crank and between said second crank and said second link crank.

8. The apparatus of claim 7 wherein said control system calculates stride length of both the first and second pedal lever based on said phase between said first link crank and said first crank and on the phase between said second link crank and said second crank.

9. The apparatus of claim 1 including a shaft angle encoder mounted on the pivot points of said rocker and said pedal lever.

10. The apparatus of claim 9 wherein the stride length is calculated using the maximum and minimum angles between said rocker and said pedal lever.

11. The apparatus of claim 1 wherein said sensor mechanisms include a first and a second magnet located along said pedal lever at a predetermined distance.

12. The apparatus of claim 11 wherein said sensor mechanisms include a hall effect sensor.

13. The apparatus of claim 1 wherein the stride length of said pedal lever is calculated from the speed of said pedal lever.

14. An exercise apparatus comprising:
a frame;
a pivot axle supported by said frame;
a control system;
a first pedal lever including a first, a central and a second portion;
a second pedal lever; including a first, a central and a second portion;
a first pedal, secured to said central portion of said first pedal lever;
a second pedal, secured to said central portion of said second pedal lever;
a first crank rotationally connected to said pivot axle;
a second crank rotationally connected to said pivot axle;
a first and second stride adjustment mechanism, operatively associated with said first and second pedal levers and said first and second cranks effective to change the horizontal portion of the elliptical path of said first and second pedal lever; and
a first and a second sensor mechanism operatively associated with each of said pedal levers respectively and connected to said control system for generating a signal representing the stride length of said first and second pedal levers respectively such that the stride length of said first and second pedal levers can be calculated individually by said control system.

15. The apparatus of claim 14 wherein said control system effectively compares the calculated stride length for said first pedal lever and said second pedal lever.

16. The apparatus of claim 15 wherein said control system operates said first or second stride adjustment mechanism so that the first stride length is equal to the second stride length.

* * * * *